United States Patent [19]

Brazhnikov

[11] 4,118,983

[45] Oct. 10, 1978

[54] METHOD OF AND DEVICE FOR CONTROLLING GAS-LIQUID OR LIQUID-LIQUID INTERFACE IN MONOLAYER RESERVOIRS

[76] Inventor: Nikolai Ivanovich Brazhnikov, I ulitsa Bebelya, 3, korpus 11, kv. 48, Moscow, U.S.S.R.

[21] Appl. No.: 709,805

[22] Filed: Jul. 29, 1976

[30] Foreign Application Priority Data

| Aug. 4, 1975 | [SU] | U.S.S.R. | 2160657 |
| Aug. 4, 1975 | [SU] | U.S.S.R. | 2162829 |
| Aug. 11, 1975 | [SU] | U.S.S.R. | 2161351 |
| Aug. 11, 1975 | [SU] | U.S.S.R. | 2165624 |

[51] Int. Cl.$^2$ .............................................. G01F 23/28
[52] U.S. Cl. ................................... 73/290 V; 340/621
[58] Field of Search ................. 73/290 V; 340/244 R, 340/1 L

[56] References Cited

FOREIGN PATENT DOCUMENTS

| 242,639 | 1/1963 | Australia | 73/290 V |
| 809,681 | 3/1959 | United Kingdom | 340/244 |
| 873,538 | 7/1961 | United Kingdom | 73/290 V |

*Primary Examiner*—James J. Gill
*Attorney, Agent, or Firm*—Lackenbach, Lilling & Siegel

[57] ABSTRACT

A method of controlling gas-liquid or liquid-liquid interface in monolayer reservoirs, wherein mechanical vibrations are excited within a section of the reservoir wall by means of a wave of acoustic vibrations, the velocity of propagation of mechanical vibrations being approximately equal to that of the wave wake of acoustic vibrations along this wall, the interface being ascertained from the amplitude of the acoustic wave transformed from said mechanical vibrations which propagate along said reservoir wall. A device for performing said method consists of two sound conductors with effective areas, an emitter of the wave of acoustic vibrations and a receiver of an acoustic wave being established on said effective areas respectively. Effective areas of the sound conductors are located at an angle to the contact areas of said conductors that are in contact with the reservoir wall, said angle being determined from the conditions of excitation of mechanical vibrations in the reservoir wall, this feature completely excluding control errors caused by the diffraction divergence of the acoustic wave in the media and by its considerable scattering particularly in liquid media.

35 Claims, 20 Drawing Figures

U.S. Patent  Oct. 10, 1978  Sheet 1 of 5  4,118,983
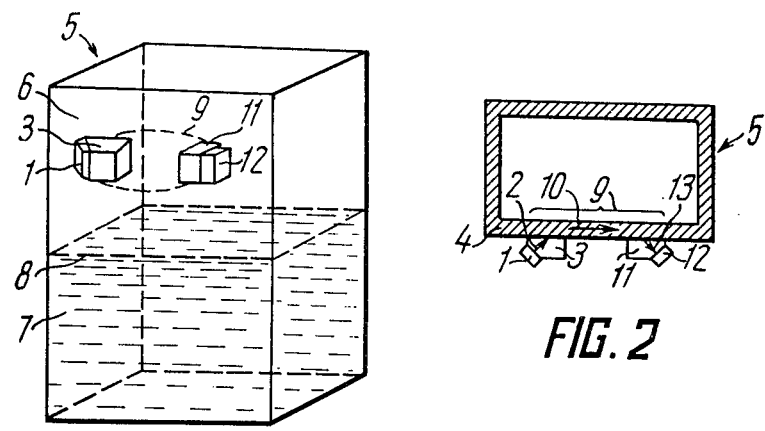
FIG.1
FIG.2
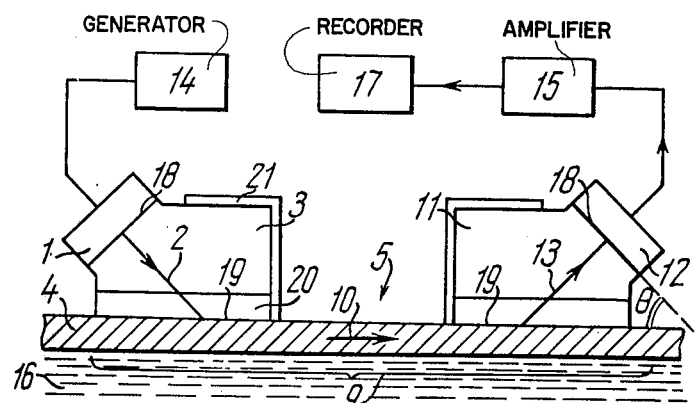
FIG.3

METHOD OF AND DEVICE FOR CONTROLLING GAS-LIQUID OR LIQUID-LIQUID INTERFACE IN MONOLAYER RESERVOIRS

The present invention relates to automatic control of technological parameters in various production processes in various industries by means of acoustic vibrations, and more particularly to a method of and a device for controlling gas-liquid or liquid-liquid interface in monolayer reservoirs. The invention can be used in automatic systems of controlling hydrometallurgical and ore-dressing processes in ferrous and non-ferrous metallurgy, in chemical, petrochemical, food stuffs and other industries for automatic non-contact control of interfaces of various media in technological monolayer reservoirs.

Control of interfaces is based on differences in any properties of such media. Production processes being controlled may be characterized by various factors of destabilization of the medium properties, which hinder the control of gas-liquid and liquid-liquid interfaces. Among these factors are varying or lowered density of liquids, elevated pressures and viscosity, permittivity variations, stirring of the liquid by gas bubbles, a considerable foam layer of variable consistency on the liquid surface, diverse suspensions inside the liquid, and some other factors.

The main requirement imposed upon methods and devices for controlling gas-liquid and liquid-liquid interfaces is minimizing the effect of the destabilizing factors on the reliability and accuracy of control. It is also required that the method of controlling be sensitive, safe for the service personnel, that the device be simple in construction, and that its market price be low.

For controlling interfaces use can be made of methods and devices which, according to their technological features, can be classified into two groups: probe and non-contact ones. In the methods and devices belonging to the first group sensitive elements which provide information on the interface being controlled are introduced into a technological reservoir containing said media and contact these media. As far as the second group is concerned, sensitive elements are outside the reservoir being controlled and are not subject to direct effect of the media, whose interface is to be controlled.

Known in the art are a float method and a device for controlling an interface which pertain to the first group. This known method resides in that a sealed hollow or a non-hydroscopic body possessing a low density (a float) having a buoyancy negative with respect to the upper medium and a positive buoyancy with respect to the lower medium, the interface therebetween which is to be controlled, is placed in the reservoir containing these media and the vertical displacement of the body is registered, the position thereof being indicative of the controlled interface. The known device contains, in addition to the float, a system for registering the float displacement. As such a system use can be made of an induction coil and an indicator of a change in the electromagnetic field of the coil caused by the float displacement with respect to the coil.

However, these known method and device have poor reliability and accuracy in controlling the interface between viscous media insofar as the float sticks in one of the media, as well as in controlling the gas-liquid interface when thick foam present on the liquid surface envelops the float at some distance from the surface which cannot be predicted.

Likewise known in the art are a capacitive method and device for controlling interface, also pertaining to the first group.

This known method involves placing inside a reservoir a sensitive element, the sensitive element being in the form of two plates (or rods) with a gap between them and the capacity of the element is measured, which depends on the permittivity of the medium in the gap, the location of the interface being determined from the capacity thus measured. The known device contains, in addition to the capacitive sensitive element, a recorder of a change in the capacity of the element, which takes place when the interface being controlled shifts with respect to said recorder.

The known method and device for controlling interfaces are disadvantageous in that their reliability is poor since the permittivity of media is variable and the gap of the sensitive element, and, hence, its capacity, changes because of suspended particles present in the media.

Also known in the art is an impedance method and device for controlling interfaces, also pertaining to the first group. Said known method resides in measuring the electric impedance of an ultrasonic emitter located inside a reservoir, the value of said electric impedance changing when the interface passes the level at which the emitter is located. The device contains an ultrasonic emitter, a generator of electric oscillations coupled to it, and a recorder of a change in the electric impedance of the emitter.

Said known method and device are characterized by small dynamic range of controlling gas-liquid interface with respect to the densities of liquid media and by insufficient reliability of controlling liquid-liquid interface. The latter disadvantage is caused by small differences between the electric impedances of the emitter which is acoustically damped by the liquids whose interface is controlled.

A disadvantage common to all the above-cited methods and devices pertaining to the first group is also the necessity of locating the sensitive elements inside the reservoir, which requires that the technological process be stopped when mounting, carrying out preventive checks of or repairing the device. Besides, the service life and reliability of these devices drastically diminish when the reservoirs are filled with chemically aggressive liquids.

The method and devices pertaining to the second group do not suffer from these disadvantages.

Known in the art are a radioisotopic method and device for controlling interfaces, pertaining to the second group.

The method resides in determining the difference in the absorption of radioactive radiation that passes through a technological reservoir in a direction coinciding with the axis of said reservoir, by the media in the reservoir whose interface is controlled. The device for performing said method contains a source and a receiver of radioactive radiation, which are located on different sides of the external surface of the reservoir, and a recorder coupled to the receiver.

The disadvantages inherent in this method and in the device for controlling interfaces are poor accuracy, complexity of construction, high market price of the device, and possible radiation hazards for the attending personnel.

Likewise known in the art is a method of controlling gas-liquid and liquid-liquid interfaces in monolayer reservoirs.

This method resides in that a wave of acoustic vibrations is excited and transmitted into a reservoir through a sound-conducting medium which contacts a section of a monolayer reservoir wall; the acoustic wave is received which has passed through the reservoir and another sound-conducting medium contacting another section of the monolayer reservoir wall, and gas-liquid or liquid-liquid interface is ascertained from the amplitude of the passed acoustic wave. Changes in the amplitude are caused by the difference in the passage of the acoustic wave inside the reservoir through the media whose interface is controlled by such a method.

A device for controlling gas-liquid or liquid-liquid interface in monolayer reservoirs is known which comprises an emitter of a wave of acoustic vibrations, coupled to a generator of electric oscillations, a receiver of the acoustic wave being located in the path of said wave from the emitter, the receiver together with the emitter being located on the monolayer reservoir wall, each cooperating with a respective sound conductor, the contact areas of said sound conductors contacting the reservoir wall, and the effective areas thereof contacting the corresponding effective area of the emitter of the wave of acoustic vibrations or of the receiver of the acoustic wave, the output of the receiver being coupled to a circuit constituted by an amplifier of electric signals coming from the output of the receiver and a recorder of the amplitude of said electric signals, said amplifier and recorder being connected in series, said amplitude being used to ascertain the gas-liquid or liquid-liquid interface.

The above-cited method of controlling gas-liquid and, particularly, liquid-liquid interfaces and the device for performing this method, when used in a number of industrial processes for example, ore-dressing, hydrometallurgical, or chemical processes, do not ensure the required accuracy of control, which leads to considerable errors, complicates the construction of the device, and increases its market price.

These unfavourable factors are conditioned by that the cross-sections of the reservoirs are as large as 8–10 meters, this causing a sharp diffraction divergence of the acoustic wave, with the amplitude of said acoustic wave being weakened considerably in the reception zone. To diminish the diffraction effect, the size of the emitter and the frequency of the emitted wave should be increased, which, in its turn, requires that the power of the generator of electric oscillations be considerably enhanced, this involving a corresponding increase in the complexity and cost of the device.

Besides, the presence of gas bubbles and solid particles in liquid media inside the reservoir causes a considerable scattering of the acoustic wave propagating in these media, the amplitude of the received wave weakening exponentially with an increase of the reservoir size. All this results in considerable errors and, in a number of cases, renders said method and device impracticable.

It is an object of the invention to provide a method of controlling gas-liquid and liquid-liquid interfaces in monolayer reservoirs and a device for performing such method, which will ensure the control in a wide range of physico-chemical composition, state, and properties of the media.

Another object of the invention is to increase the accuracy of the control of interfaces.

A further object of the invention is to simplify the design of the device and cut down its operation costs and market price.

Said objects are accomplished by a method of controlling gas-liquid and liquid-liquid interfaces in monolayer reservoirs, residing in that a wave of acoustic vibrations is excited and transmitted into said reservoir through a sound-conducting medium contacting a section of the monolayer reservoir wall, an acoustic wave is received which has passed through the reservoir and another sound-conducting medium, contacting another section of the reservoir wall, gas-liquid and liquid-liquid interface being ascertained from the amplitude of said passed acoustic wave. According to the invention, the excited wave of acoustic vibrations is preliminarily oriented in said first sound-conducting medium at an acute or obtuse angle to the monolayer reservoir wall, said wave being used for exciting mechanical vibrations within a corresponding wall section, these mechanical vibrations propagating along the wall in a direction determined by the direction of propagation of the wave of acoustic vibrations and by the angle of entry of said wave, the velocity of the wake of the wave of acoustic vibrations being set, when orienting said wave, approximately equal to that of propagation of mechanical vibrations along this wall, the interface being ascertained from the amplitude of the acoustic wave transformed from the mechanical vibrations propagating along the reservoir wall.

It is expedient that, in the event the cross-section of the monolayer reservoir wall is variable, the section of the latter be excited by a divergent or convergent wave of acoustic vibrations, the maximum and minimum angles $\theta_1$ and $\theta_2$ of entry of the wave being selected from the relationship:

$$\frac{\sin \theta_1}{\sin \theta_2} \geqq \frac{C_1}{C_2},$$

were $\theta_1$ and $\theta_2$ are angles of entry of the wave of acoustic vibrations determined by the direction of propagation of said wave and by the normal to the reservoir wall in the zone of introducing said wave;

$C_1$ and $C_2$ are respective maximum and minimum velocities of propagation of mechanical vibrations within the reservoir wall section excited by the wave of acoustic vibrations.

It is also expedient to again excite mechanical vibrations within said reservoir wall section with the aid of a secondary wave of acoustic vibrations, the attenuation of these latter mechanical vibrations being different from that of the mechanical vibrations excited by the primary wave of acoustic vibrations, the interface being ascertained from the relationship between the amplitudes of the mechanical vibrations excited by said primary and said secondary waves of acoustic vibrations.

It is useful to excite periodically the reservoir wall section by a pulse wave of acoustic vibrations, the spectrum of said pulse wave being selected from a range exceeding the frequency range of mechanical vibrations of the reservoir wall, with the interface being found in different positions with regard to the vibrating wall section, the filling frequency of the pulse acoustic wave being additionally determined so as to ascertain the kind of liquid when the interface lies above or below the vibrating section of the reservoir wall.

It is also possible to periodically excite the wall section by a pulse wave of acoustic vibrations, the relative width of the spectrum thereof being selected equal to or exceeding the relative variation in the thickness of the vibrating section of the reservoir wall.

The above-cited object is accomplished by a device for controlling gas-liquid or liquid-liquid interface in monolayer reservoirs, comprising an emitter of a wave of acoustic vibrations coupled to a generator of electric oscillations, a receiver of the acoustic wave being located in the path of said wave of acoustic vibrations from said emitter, said receiver being located together with said emitter on a monolayer reservoir wall, said emitter and receiver having appropriate sound conductors, a contact area of each of said sound conductors contacting the reservoir wall and an effective area thereof contacting the respective effective area of the emitter of a wave of acoustic vibrations or of the receiver of a wave of acoustic vibrations, said receiver having its output coupled to a circuit constituted by an amplifier of electric signals coming from the output of the receiver and a recorder of the amplitude of said electric signals, said amplifier and said recorder being connected in series, said amplitude being used to ascertain a gas-liquid or liquid-liquid interface. According to the invention, the contact and effective areas of the sound conductors lie at angles $\theta$ with respect to each other, these angles being determined from the relationship $$\theta = \text{arc Sin } C_3/C,$$

where $C_3$ is the velocity of propagation of acoustic waves in the sound conductors;

C is the velocity of propagation of mechanical vibrations, that are excited by the wave of acoustic vibrations, along the reservoir wall, said sound conductors being made of a material such that the velocity of propagation of the acoustic wave therein is less than the velocity of propagation of the mechanical vibrations along the reservoir wall.

It is expedient, in the event of the cross-section of the reservoir wall being variable, to make the sound conductors from two parts, the material of each of said parts differing as to the velocity of propagation of the wave of acoustic vibrations therein, the parts having cylindrical contact areas, and the axis of symmetry of these areas lying in the same plane with the axis of the emitter or of the receiver perpendicularly to said axis, the radius of the contact areas being determined from the relationship:

$$R \leq \frac{C_1 + C_2}{C_4 + C_5} \left| \frac{C_4 - C_5}{C_1 - C_2} \right| A \cot \theta,$$

where
$C_1$ and $C_2$ are respective maximum and minimum velocities of propagation of mechanical vibrations within the reservoir wall section being excited by the wave of acoustic vibrations;
$C_4$ and $C_5$ are the velocities of propagation of the wave of acoustic vibrations in different parts of the sound conductors;
A is the length of the effective area of the sound conductors in a plane passing through a line coincident with the direction of propagation of the mechanical vibrations excited in the reservoir wall and through the normal to this area, this feature ensuring divergence or convergence of the wave of acoustic vibrations.

It is expedient that, in the event of the cross-section of the reservoir wall being variable, the sound conductors have their effective area of a cylindrical shape with a radius of curvature determined from the relationship:

$$R \leq \frac{C_1 + C_2}{2(C_1 - C_2)} A \cot \theta$$

the emitter and the receiver of the acoustic wave being made with the effective areas having a shape similar to that of the effective areas of the sound conductors, this feature ensuring divergence or convergence of the wave of acoustic vibrations.

It is also advisable that, in the event of the cross-section of the reservoir wall being variable, the length A of the effective areas of the sound conductors in the plane passing through the normal to said area and through the line coincident with the direction of propagation of mechanical vibrations excited in the reservoir wall be determined from the relationship:

$$A \leq \kappa \left| \frac{C_1 + C_2}{C_1 - C_2} \right| \lambda \cdot \cot \theta,$$

where $k$ is a coefficient determined by the shape of the effective areas of the sound conductors;
$\lambda$ is the length of the wave of acoustic vibrations in the sound conductors, the minimum distance H min between the effective and contact areas being determined from the relationship:

$$H \text{ min} > (A^2/4\lambda) \cos \theta,$$

this feature ensuring divergence or convergence of the wave of acoustic vibrations.

It is also possible that, for the case when the reservoir wall section is again excited by the wave of acoustic vibrations, the sound conductors in the device have a second effective area making an angle $\gamma$ with the contact area, said angle $\gamma$ being determined from the relationship:

$$\gamma = \text{arc Sin } C_3/C_6,$$

where
$C_6$ is the velocity of propagation of the mechanical vibrations being again excited within said reservoir wall section,
and the device be provided with an additional emitter of the wave of acoustic vibrations and an additional receiver of the acoustic wave, located on said additional effective areas of the respective sound conductors, the additional emitter being coupled together with the main emitter to the generator of electric oscillations; the device also incorporating a circuit comprising by a series-connected additional amplifier of electric signals, coupled to an additional reciever, a shaper adapted to shape a reference electric signal and a block for comparing an informative electric signal with the reference one; as well as a shaper, being adapted to shape an informative electric signal, the input thereof being coupled to the output of the main amplifier and the output being coupled to another input of the comparison block the electric connection of the main amplifier with the recorder being effected with the aid of the shaper of the informative electric signal and the comparison block.

It is useful that the distance E between the projections of the centres of the main and additional effective areas of the sound conductors on the contact areas of said sound conductors be determined from the relationship:

$$E = H_1 \tan \theta - H_2 \tan \gamma,$$

where $H_1$ and $H_2$ are the respective distances between the centres of the main and additional effective areas and the contact areas of the sound conductors respectively.

It is also expedient that in the device, in the case of the reservoir wall section being again excited by a wave of acoustic vibrations, the sound conductors have a reflecting area making an angle $\beta$ with the effective area, said angle $\beta$ being determined from the relationship $$\beta = (\pi/2) - (\theta - \text{arc Sin } C_3/C_6),$$

and that the device be provided with a circuit constituted by a series-connected first block of selection of electric signals, the input of said block of selection being coupled to the output of the amplifier of electric signals, the shaper of an informative electric signal and a block for comparing the informative electric signal with the reference one; it is expedient also that the device have a shaper of a reference electric signal, whose output is coupled to another input of the block for comparing the informative electric signal with the reference one, and a second block of selection of electric signals, the output thereof being coupled to the input of the shaper of the reference electric signal and the input, to the output of said amplifier, as well as a shaper of the selecting pulses, whose outputs are coupled to controlled inputs of the selection blocks, as a generator of electric oscillations use being made of a generator of oscillations pulse-modulated in amplitude, the output of said generator being coupled to the input of the shaper of selecting pulses, the electric connection of the amplifier with the recorder being effected with the aid of said series-connected first selection block, the shaper of the informative electric signal and the comparison block.

It is expedient that in the device, in the event of the reservoir wall section being excited by a pulse wave of acoustic vibrations, the generator of electric oscillations should comprise a shaper of wide-spectrum electric pulses and a power amplifier coupled to the shaper, the output of said power amplifier being coupled to the emitter of a wave of acoustic vibrations, and the device contain a shaper of an informative electric signal, whose input is coupled to the output of an amplifier of electric signals, a block for comparing an informative electric signal with a reference one, the input of said block being coupled to the output of the shaper, and a shaper of a reference electric signal, the input thereof being coupled to the power generator and the output, to another input of the comparison block, a block adapted to measure the frequency of electric signal, the input of said block being coupled to another output of the amplifier of electric signals, the electric connection of the amplifier with a recorder being performed with the aid of a circuit constituted by the series-connected shaper of the informative electric signal and the comparison block.

It is also expedient to make the sound conductors in the device from fused quartz or porcelain, or silica glass, or lead, or tin, or lead-tin alloys having an acoustic impedance within the range from 0.3–1.7 of the acoustic impedance of the emitter and of the receiver of the acoustic wave.

It is also possible to make sound conductors on the basis of aqueous solutions of alcohols or alkalies, or acids, or salts of inorganic acids, which have an approximately parabolic temperature dependence of the velocity of propagation of the acoustic wave, the concentrations of the solutions being selected such that the maximum value of the acoustic wave propagation velocity should lie within the mean temperature zone of the reservoir wall.

The above described method of controlling gas-liquid or liquid-liquid interface in monolayer reservoirs and the device for performing said method have a number of advantages over the known methods and devices.

The above-described method and device allow a considerable decrease in the errors when controlling interfaces in monolayer reservoirs, and, hence, an increase in the accuracy and reliability of the control.

First, the herein-proposed method completely excludes control errors caused by the diffraction divergence of the acoustic wave in the media whose interface is controlled in the reservoir, since the wave propagating in said media need not be recorded. The diffraction effect of the mechanical vibrations propagating in the wall and being recorded according to the present invention is rather weak and practically does not affect the control accuracy.

Secondly, the herein-proposed method completely excludes errors caused by considerable scattering of the acoustic wave propagagating in liquid media whose interface is controlled. This is attained in the present method in that the parameter employed for ascertaining the interface the amplitude of acoustic wave, transformed from mechanical vibrations propagating along the reservoir wall, the propagation of these vibrations being independent of the acoustic wave scattering in the liquid media filling the reservoir being controlled.

Furthermore, the design of the device for realizing the herein-proposed method, according to the invention, is essentially simplified owing to the possibility of using an emitter of a smaller size and an essentially less powerful generator of electric oscillations. This becomes possible insofar as in the herein-proposed device there is no need to drastically increase the power of the acoustic wave, whereas in the prior-art device this is mandatory for ensuring the passage of the acoustic wave through large industrial reservoirs. In the herein-proposed device such drastic increase in the power of the acoustic wave is obviated due to the fact that the informative acoustic wave is received by the receiver within a section remote from the section within which the acoustic wave is transmitted by practically one order of magnitude, and also due to smaller cross-section of the reservoir.

Other objects and advantages of the herein-proposed method and device for controlling gas-liquid or liquid-liquid interface will become more fully apparent from a consideration of a detailed description of specific embodiments thereof in conjunction with the accompanying drawings, wherein:

FIG. 1 is a general view of a monolayer reservoir with an emitter and a receiver of an acoustic wave mounted on a side surface of the reservoir, according to the invention;

FIG. 2 is a top view of the same arrangement in FIG. 1 (with the reservoir shown in cross-section);

FIG. 3 shows the device of the invention for controlling gas-liquid or liquid-liquid interface in monolayer reservoirs, provided with sound conductors made in accordance with a first embodiment of the invention (the reservoir being shown in a longitudinal section);

Figure 4:
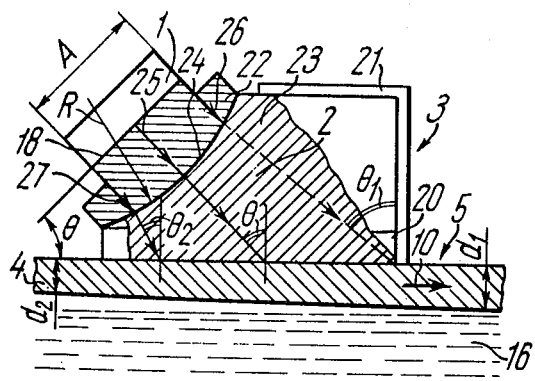
FIG. 4 shows a section of a reservoir wall with an emitter of a wave of acoustic vibrations mounted thereon with the aid of a sound conductor made in accordance with a second embodiment of the invention (in partial longitudinal section)

The proposed device for controlling gas-liquid and liquid-liquid interfaces in monolayer reservoirs comprises an emitter 1 (FIG. 1) of a wave 2 (FIG. 2) of acoustic vibrations, said emitter being mounted with the aid of a sound conductor 3 on a wall 4 of a monolayer reservoir 5 containing gas and liquid media 6 (FIG. 1) and 7 with an interface 8. The emitter 1 is mounted on a section 9 in such a way that mechanical vibrations 10 are excited by the transmitted wave 2 of acoustic vibrations within the section 9 of the wall 4 (FIG. 2), said mechanical vibrations propagating in a prescribed direction.

The device also comprises a receiver 12 of an acoustic wave 13 transformed from the mechanical vibrations 10 said receiver 12 being mounted on the section 9 with the help of a sound conductor 11 in the path of propagation of the mechanical vibrations 10.

A generator 14 (FIG. 3) of electric oscillations is coupled to the emitter 1 and a circuit constituted by a series-connected amplifier 15 of electric signals and recorder 17 (FIG. 1) of the amplitude of these signals is coupled to the receiver 12, the amplitude of said electric signals being dependent on the type of medium 16 contacting the section 9 of the wall 4, said medium being above or below the interface 8 (FIG. 1).

For the velocity of the wake of the wave 2 of acoustic vibrations transmitted into the reservoir 5 along the wall 4 to be approximately equal to the velocity of propagation of the mechanical vibrations 10 along said wall, the effective area 18 of the sound conductors 3, 11, on which the emitter 1 and the receiver 12 are mounted, respectively, and the contact area 19 of these sound conductors 3, 11 lie at angles $\theta$ with respect to each other, said angles being determined from the relationship:

$$\theta = \text{arc Sin } C_3/c, \tag{1}$$

where
  $C_3$ is the velocity of propagation of the acoustic waves 2, 13 in the sound conductors 3, 11;
  C is the velocity of propagation of the mechanical vibrations 10, excited by the wave 2 of acoustic vibrations, along the wall 4 of the reservoir 5.

The sound conductors 3, 11 are made of a material in which the velocity of propagation of the acoustic waves 2, 13 is less than the velocity of propagation of the mechanical vibrations 10 in the wall 4 of the reservoir 5.

The sound conductors 3, 11 can be made either from the same material, or from different materials. In the latter case, as follows from relationship (1), the angles $\theta$ in the sound conductors 3, 11 will also be different. In all the exemplary embodiments described below the sound conductors 3, 11 are assumed to be made from the same material. In the embodiment being described the sound conductors 3, 11 are made of Plexiglas and can also be made of a 16% solution of ethyl alcohol.

The sound conductors 3, 11 are mounted with their contact surfaces 19 on the wall 4 of the reservoir 5 within the section 9 being excited with the help of a flange 20, said flange being fixed by studs (not shown in the drawing) preliminarily welded to the reservoir 5 and passing through appropriate holes in the flange 20. Another version is also possible when the flange 20 is cemented to the wall 4 of the reservoir 5.

Part of the surface of the sound conductors 3, 11 in the embodiment being described is coated with a layer 21 of a material absorbing acoustic waves, the material being a mixture of an epoxy resin and a polymerizing agent, with a tungsten powder as a filler.

The emitter 1 of the acoustic wave vibrations is of the piezoelectric type (see, for instance, U.S. Pat. No. 2,931,223). The receiver 12 is of the same design as the emitter 1. A generator 14 employs a well-known continuous crystal-stabilized oscillator circuit. A recorder 17 of the amplitude of the electric signals may be made according to a known scheme (see, for, example, U.S. Pat. No. 3,345,861, where an analogue scheme is disclosed. The recorder 17 may include a relay block when there is a need in relay-contact signalization about the presence of the interface being controlled at a prescribed level.

The above described device is the simplest one for the case when the cross-section of the wall 4 of the reservoir 5 is constant.

The effect of the variable cross-section of the wall 4 of the reservoir 5 on the control of the interface 8 (FIG. 1) between the media 6 and 7 can be diminished by exciting the section 9 of the wall 4 of the reservoir 5 by a divergent or convergent wave of acoustic vibrations, with the angles of entry selected from the relationship:

$$\frac{\sin\theta_1}{\sin\theta_2} \geqq \frac{C_1}{C_2}, \tag{2}$$

where $\theta_1$ and $\theta_2$ are the angles of entry of the wave 2 (FIG. 4) of acoustic vibrations determined by the direction of propagation of said wave 2 and by the normal to the wall 4 of the reservoir 5 in the zone of entry; $C_1$ and $C_2$ are respective maximum and minimum velocities of propagation of the mechanical vibrations 10 within the section 9 of the wall 4 of the reservoir 5, said vibrations being excited by the wave 2 of acoustic vibrations.

For each value of the variable cross-section of the wall 4 in the range from $d_1$ to $d_2$ there exists an angle of entry, satisfying the conditions of equality of the velocity of the wake of the introduced wave 2 to that of propagation of the mechanical vibrations 10 within said thickness range of the wall 4, optimum for the excitation of the mechanical vibrations 10 being thus maintained.

Figure 5:
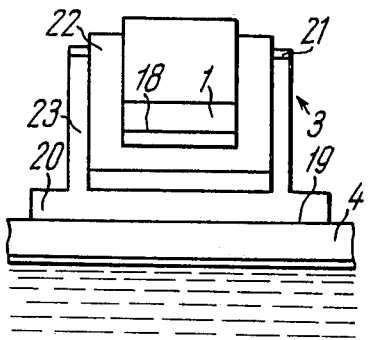
FIG. 5 is a side view of the same arrangement as shown in FIG. 4.

To introduce a convergent or divergent wave within the range of angles from $\theta_1$ to $\theta_2$, each of the sound conductors, 3, 11, according to the first embodiment, is made of two parts 22 (FIG. 4) and 23, the material of said parts being different as to the velocity with which the waves 2, 13 (FIG. 3) of acoustic vibrations propagate therein. The parts 22 (FIG. 4) and 23 have a cylindrical contact area 24 with the axis of symmetry lying in the same plane with the axis of the emitter 1 and of the receiver 12 (FIG. 3) perpendicularly to the axis. The radius of the contact areas 24 (FIG. 4) is determined from the relationship:

$$R \leqq \frac{C_1 + C_2}{C_4 + C_5} \left| \frac{C_4 - C_5}{C_1 - C_2} \right| A \cot \theta, \tag{3}$$

where $C_4$ and $C_5$ are the velocities of propagation of the waves 2, 13 of acoustic vibrations in the separate parts 22 (FIG. 5) and 23 of the sound conductors 3, 11 (FIG. 3);

A is the length of the effective area 18 of the sound conductors 3, 11 in the plane passing through the line coincident with direction of propagation of the mechanical vibrations 10 being excited in the wall 4 and through the normal to this area 18. Central ray 25 (FIG. 4) of the wave 2 of acoustic vibrations passes through the contact area 24 without refraction and enters the wall 4 at an angle to the normal equal to the angle $\theta$ of inclination of the effective area 18 of the part 22 of the sound conductor 3. Side rays 26 and 27 are refracted on said area 24 and enter the wall 4 at angles $\theta_1$ and $\theta_2$, said angles being, respectively, greater or smaller than the angle $\theta$ of entry of the central ray 25.

To eliminate volume reverberation of the sound conductors 3, 11 (FIG. 3) caused by multiple reflections of the waves 2, 13 of acoustic vibrations, the sound conductors 3, 11 are partly covered with a layer 21 (as in the embodiment shown in FIG. 3) of a material that absorbs acoustic waves.

Diminution of the effect caused by variations in thickness of the wall 4 of the reservoir 5 also results since the effective area 18 of the sound conductor 3 (FIG. 6) of the emitter 1 and of the sound conductor 11 (FIG. 3) of the receiver 12 is made cylindrical with a radius of curvature R (FIG. 6), the ratio between the radius R and the length A of this area 18 in the plane passing through the normal to said area 18 and through the line coincident with the direction of propagation of the mechanical vibrations 10 excited in the wall 4 being determined from the expression:

$$\frac{A}{R} \geqq 2 \frac{C_1 - C_2}{C_1 + C_2} \tan \theta \tag{4}$$

The emitter 1 and the receiver 12 (FIG. 3) are made in the form of a part of a hollow cylinder with an inner radius of curvature equal to the radius R (FIG. 6) of the effective area 18 (FIG. 7) of the sound conductors 3, 11 (FIG. 3); a convergent ray bundle is introduced into the wall 4 within the range of angles from $\theta_1$ (FIG. 6) to $\theta_2$, ensuring optimum excitation of the mechanical vibrations 10 of the section of the wall 4 with a thickness varying from $d_1$ to $d_2$. The effect of variations in the thickness of the wall 4 of the reservoir 5 is diminished also due to the fact that the length A of the effective area 18 (FIG. 8) of the sound conductors 3, 11 (FIG. 3) in the plane passing through the normal to this area 18 and through the line coincident with the direction of propagation of the mechanical vibrations 10 excited in the wall 4 is determined from the relationship:

$$i A \leqq \kappa \left| \frac{C_1 + C_2}{C_1 - C_2} \right| \lambda \cdot \cot \theta, \tag{5}$$

where $k$ is a coefficient determined by the shape of the effective area 18 of the sound conductors 3, 11, said coefficient being equal to 0.86 for a round effective area and to 0.7 for a rectangular one;

(the numeric values are obtained from analytical expressions for directivity patterns of emitters having the emitting surfaces of the above-stated shapes);

$\lambda$ is the length of the waves 2, 13 of acoustic vibrations in the sound conductors 3, 11;

$\theta$ is the angle of inclination of the effective area 18 of the sound conductors 3, 11.

The minimum distance $H_{min}$ (FIG. 9) between the effective area 18 and the contact area 19 of the sound conductors 3, 11 (FIG. 3) is determined from the relationship:

$$H_{min} > A^2/4\lambda \cos \theta, \qquad (6)$$

As a result, plane front 28 (FIG. 8) of the wave 2 of acoustic vibrations, preserved over a distance B, is transformed, when approaching the contact area 19, into a partially spherical front with divergent rays, the angle of entry of said rays into the wall 4 lying within the range from the maximum angle $\theta_1$ to the minimum angle $\theta_2$ which ensure excitation of the mechanical vibrations 10 within the prescribed thickness range from $d_1$ to $d_2$ of the wall 4 of the reservoir 5.

Instability of excitation of the wave 2 (FIG. 10) of acoustic vibrations in the sound conductor 3, used for exciting mechanical vibrations 10 within a prescribed section of the wall 4 of the reservoir 5, is eliminated by incorporating into the electric circuit of the proposed device an additional circuit constituted by a series-connected shaper 29 adapted to shape a reference electric signal from electric oscillations of the generator 14, the input of said shaper being coupled to the output of the generator, a block 30 for comparing an informative electric signal with a reference one, and a shaper 31 adapted to shape an informative electric signal from electric signals of the amplifier 15, the input of the shaper 31 being coupled to the output of the amplifier 15. The output of the comparison block 30 is coupled to the recorder 17 which is fed with a signal which, depending on the object pursued by the control, is proportional either to the difference or to the ratio between the informative and the reference electric signals.

In the described embodiment of the device, the effect of instability of the amplitude of the electric oscillations of the generator 14 on the accuracy of the control of the gas-liquid or liquid-liquid interface 8 between the media 6 and 7 (FIG. 1) in the monolayer reservoir 5 is eliminated owing to the fact that the instability equally affects the amplitudes of the reference and of the informative electric signals.

The conditions of introducing the wave 2 (FIG. 10) of acoustic vibrations through the contact area 19 into the wall 4 may change during the device operation, this involving changes in the amplitude of the mechanical vibrations 10 within the excited section 9 of the wall 4 of the reservoir 5 and, consequently, causing errors in controlling the interface 8 (FIG. 1).

To eliminate these errors, mechanical vibrations within said section 9 of the wall 4 of the reservoir 5 are again excited by a wave of acoustic vibrations, the attenuation of the latter mechanical vibrations being different from the attenuation of the mechanical vibrations excited by the primary wave. The interface 8 is ascertained from the ratio between the amplitudes of the mechanical vibrations excited by the primary and by the secondary waves.

Figure 11:
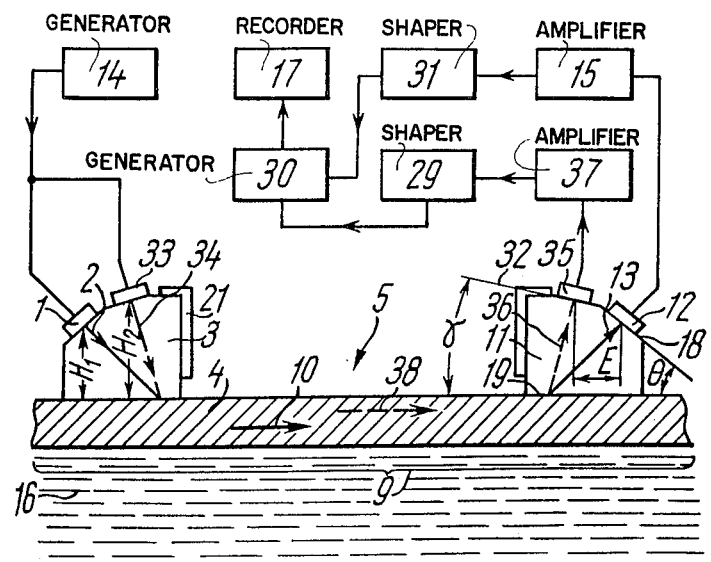
FIG. 11 shows same as device as shown in FIG. 3, with sound conductors made in accordance with a fifth embodiment of the invention and with an electronic-acoustic channel for the passage of a reference signal in the electric circuit of the proposed device.
Figure 12:
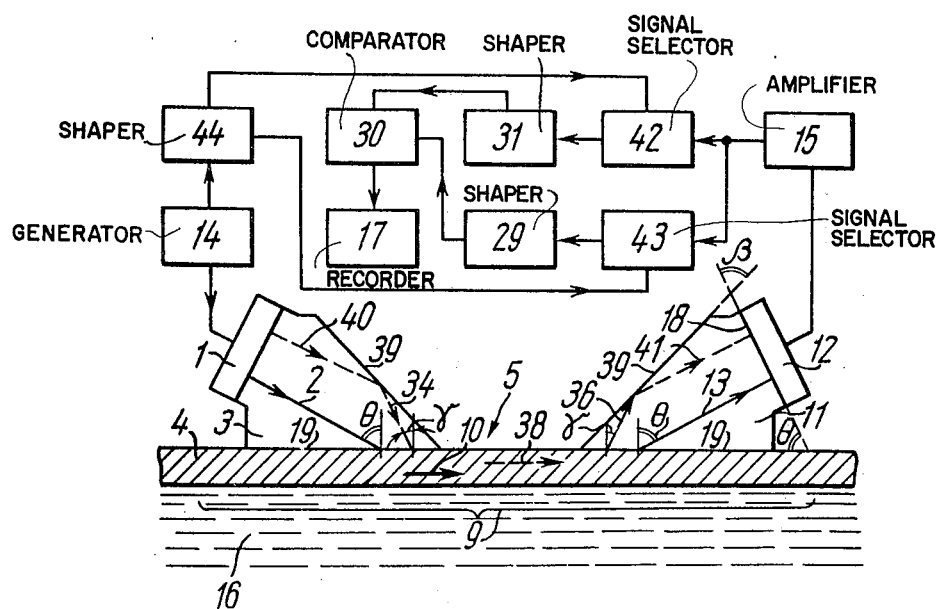
FIG. 12 shows the same device as shown in FIG. 3, with sound conductors made in accordance with a sixth embodiment thereof and with an electronic-acoustic channel for the passage of a reference signal in the electric circuit of the proposed device.

To effect the secondary excitation of mechanical vibrations in the wall 4 of the reservoir 5 by a wave of acoustic vibrations, two embodiments of the device are proposed shown in FIGS. 11 and 12 respectively.

According to the first of these embodiments, the device comprises the above-cited emitter 1 (FIG. 11) of the wave 2 of acoustic vibrations, the emitter being coupled to the generator 14 of electric oscillations and mounted on the sound conductor 3, and the receiver 12 of the acoustic wave 13, said receiver being coupled to the amplifier 15 and mounted on the sound conductor 11. The electric circuit of the now-described embodiment of the device also comprises the recorder 17, the shaper 29 of the reference electric signal, the block 30 for comparing the informative electric signal with the reference one, and the shaper 31 of the informative electric signal.

The sound conductors 3 and 11 in the instantly described embodiment of the device have an additional effective area 32 making an angle $\gamma$ with the contact area 19, said angle being selected from the relationship:

$$\gamma = \arcsin C_3/C_6, \qquad (7)$$

where $C_6$ is the velocity of propagation of mechanical vibrations again excited within said section 9 of the wall 4 of the reservoir 5.

The device also has an additional emitter 33 of a wave 34 of acoustic vibrations and an additional receiver 35 of an acoustic wave 36, the additional emitter and receiver being mounted on additional effective areas 32 of the corresponding sound conductors 3 and 11. The additional emitter 33 is coupled together with the main emitter 1 to the generator 14 of electric oscillations. The electric circuit of the device also includes an additional amplifier 37 of electric signals, the amplifier 37 being coupled to the additional receiver 35 of the acoustic wave 36, the wave 36 being transformed from mechanical vibrations 38 again excited in the wall 4 by the wave 34, the attenuation of these mechanical vibrations 38 being different from the attenuation of the primarily excited mechanical vibrations 10. The output of the amplifier 37 is coupled to the input of the shaper 29 adapted to shape the reference electric signal, the output of the shaper being coupled to one input of the block 30 for comparing the informative electric signal with the reference one. Another input of the comparison block 30 is coupled to the output of the shaper 31 adapted to shape the informative electric signal, the input of the shaper 31 being coupled to the output of the amplifier 15. The output of the comparison block 30 is coupled to the recorder 17.

In the instantly described embodiment of the device it is expedient to select the distance E between the projections of the centres of the main and additional effective areas 18 and 32, respectively, on the contact area 19 from the relationship:

$$E = H_1 \tan \theta - H_2 \tan \gamma, \qquad (8)$$

where $H_1$ and $H_2$ are the distances between the centres of the main and additional effective areas 18 and 32, respectively, and the contact area 19 of the sound conductors 3 and 11.

The provision of an additional acoustic channel (the emitter 33 of the wave 34 of acoustic vibrations — mechanical vibrations 38 in the wall 4 — the receiver 35 of the wave 36) and of an electric circuit of the reference signal (the amplifier 37 — the shaper 29) make it possible to increase considerably the control accuracy in the event of instabilities when introducing the wave 2 of acoustic vibrations into the wall 4 through the contact area 19 of the sound conductor 3 and during the reception of the wave 13 in the sound conductor 11 through its contact area 19.

In the embodiment of the device illustrated in FIG. 12 the sound conductors 3 and 11 have a reflector area 39 for ensuring the secondary excitation of the section 9 of the wall 4 of the reservoir 5 by the wave of acoustic vibrations from the emitter 1, said reflector area making an angle β with the effective area 18, the angle β being determined from the relationship:

$$\beta = (\pi/2) - (\theta - \arc \sin C_3/C) \quad (9)$$

The secondary excitation of mechanical vibrations 38 in the wall 4 propagating therewithin the velocity $C_6$ is effected with the aid of the wave 34 of acoustic vibrations, said wave 34 being transformed from wave 40 of the emitter 1 after the wave 40 has reflected from the reflector area 39. The additional wave 36 transformed from the secondary excited mechanical vibrations 38, after the reflection from the reflector area 39 in the sound conductor 11 and transformation into acoustic wave 41, is received by the same receiver 12 which receives the main acoustic wave 13. The electric circuit of the presently described embodiment of the device comprises a circuit constituted by a series-connected first block 42 of selection of electric signals, the input of said block being coupled to the output of the amplifier 15 of electric signals, the shaper 31 of the informative electric signal, and the block 30 for comparing the informative electric signal with the reference one. The circuit also includes the shaper 29 of the reference electric signal, the input of the shaper 29 being coupled to the input of the block 30, and a second block 43 of selection of electric signals, the input of the block 43 being also coupled to the output of the amplifier 15, the output of the block 43 being coupled to the input of the shaper 29. The electric circuit incorporates a shaper 44 of selecting pulses, the outputs of the shaper 44 being coupled to controlled inputs of the selection blocks 42 and 43.

As a generator 14 of electric oscillations in the instantly described embodiment use is made of generator pulse-amplitude modulated oscillations having a duration τ in each modulation period, the input of the shaper 44 of the selecting pulses being coupled to the output of said generator. The selection blocks 42 and 43 are made according to a well-known circuit of an amplifier with a controled additional input for the selecting pulse, time-coincident with the reception of the selected signal coming from the amplifier 15 of electric signals. The shaper 44 of selecting pulses is made in accordance with the circuit of a gate pulse generator (see, for example, the book by I. N. Yermolov "Methods of Ultrasonic Flaw Detection", in Russian, Moscow, MGI publishers, 1966, pp. 118–119).

In the control of the interface 8 (FIG. 1) between the media differing considerably in their physical properties, the frequency of the mechanical vibrations 10 (FIG. 2) within the excited section 9 of the wall 4 of the reservoir 5 changes with the location of said interface, whereby the conditions of excitation of said mechanical vibrations by the wave 2 of acoustic vibrations are changed; the amplitude of these mechanical vibrations and that of the electric oscillations at the output of the receiver 12 decrease. All this may cause considerable errors in controlling the interface 8 (FIG. 1).

To eliminate these adverse effects, the section 9 of the wall 4 (FIG. 2) of the reservoir 5 is periodically excited by the pulse wave 2 of acoustic vibrations, the spectrum of said wave being selected from a range exceeding that ot the frequency of the mechanical vibrations 10 of the wall 4 of the reservoir 5 at different locations of the interface 8 (FIG. 1) between the media 6 and 7 with respect to the vibrating section 9. This ensures the excitation of mechanical vibrations 10 (FIG. 2) in the wall 4 by the wave 2 at the frequency of these vibrations, irrespective of the location of the interface 8 (FIG. 1) and, consequently, of the type of the medium 16 (FIG. 3) contacting the inner surface of the excited section 9 of the wall 4 of the reservoir 5. The filling frequency of the pulse acoustic wave 13 is also determined, and said frequency is used for ascertaining the type of the liquid when the interface 8 (FIG. 1) is located above or below the vibrating section 9 of the wall 4 (FIG. 2) of the reservoir 5.

To perform periodic excitation of the section 9 of the wall 4 by the pulse wave of acoustic vibrations, the generator 14 (FIG. 13) of electric oscillations in the electric circuit of the instantly described embodiment of the device includes a shaper 45 of wide-spectrum electric pulses and a power amplifier 46 coupled to said shaper, the output of the amplifier 46 being coupled to the emitter 1 of the wave 2 of acoustic vibrations. The electric circuit also comprises the shaper 31 of the informative electric signal, the input of said shaper being coupled to the amplifier 15 of electric signals, the block 30 for comparing the informative electric signal with the reference one, the input of the block 30 being coupled to the output of the shaper 31, the shaper 29 of the reference electric signal, the input of said shaper being coupled to the power amplifier 46 and the output of said shaper being coupled to the input of the comparison block 30. The electric circuit also incorporates a block 47 adapted to measure the frequency of the electric signal, the input of said block 47 being coupled to the output of the amplifier 15 of electric signals. The output of the comparison block 30 is coupled to the recorder 17.

The shaper 45 of the wide-spectrum electric pulses in the presently described embodiment of the device is made as a shaper of electric video pulses employing a well-knowncircuit of a blocking oscillator. The duration $\tau_o$ of these video pulses is selected in accordance with the relationship:

$$\tau_o \cong 0.5 f_o^{-1}, \quad (10)$$

where $f_o$ is the mean passband frequency of the emitter 1 and, consequently, of the receiver 12.

If a piezoelectric plate is used as an active element in the emitter and in the receiver, the value $f_o$ is the frequency of resonance vibrations of this plate.

In the presently described embodiment of the device the power amplifier 46 may be made in accordance with a well-known circuit of an emitter follower.

The frequency of the primarily excited mechanical vibrations 10 and of the secondarily excited mechanical vibrations 38 (FIGS. 11, 12) changes with variations in the cross-section of the wall 4 of the excited section 9 of the reservoir 5. This changes the conditions of excitation of said vibrations and of their subsequent transformation into an acoustic wave and, consequently, decreases the amplitude of the mechanical vibrations and the magnitude of the electric signals at the outputs of the receivers 12, 35 of acoustic waves 13, 36 transformed from the mechanical vibrations 10, 38; as a result, considerable errors in controlling the interface 8 (FIG. 1) arise.

To diminish these errors, the section 9 of the wall 4 (FIG. 2) of the reservoir 5 is periodically excited by the pulse wave of acoustic vibrations, the relative spectrum width of the wave being selected equal to or exceeding the relative change in the thickness of the vibrating section 9 of the wall 4 of the reservoir 5:

$$\frac{\Delta f}{f_3} = \frac{2(f_2 - f_1)}{f_1 + f_2} \geq \frac{2(d_1 - d_2)}{d_1 + d_2} \quad (11)$$

where $f = f_2 - f_1$ is the absolute spectrum width of the pulse wave of acoustic vibrations;

$f_2$ and $f_1$ are the respective upper and lower boundaries of the spectrum of the pulse wave of acoustic vibrations;

$f_3 = 0.5 (f_1 + f_2)$ is the mean frequency of said spectrum;

$d_1$ and $d_2$ are the respective maximum and minimum thickness of the wall 4 of the reservoir 5.

Figure 13:
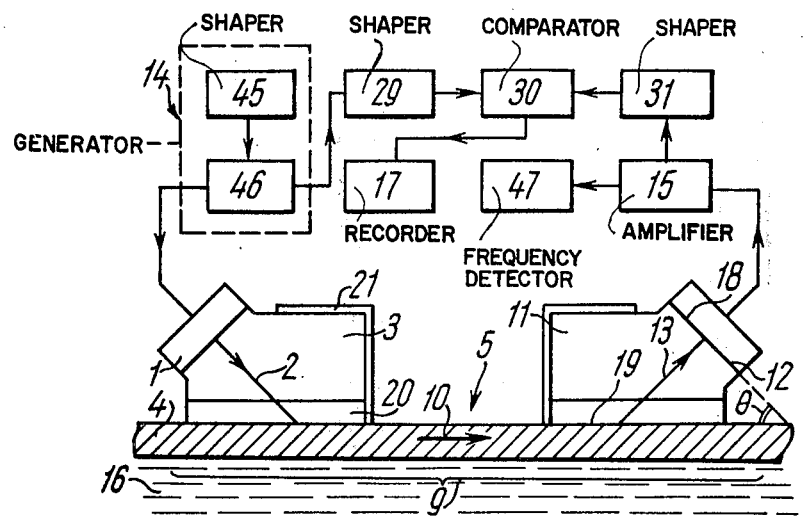
FIG. 13 shows the same device shown in FIG. 3, with an electric circuit providing pulse-excitation of a wave of acoustic vibrations.

To accomplish the present engineering solution, the sound conductors 3, 11 in the device shown in FIG. 13 are made of fused quartz or porcelain, or silica glass, or tin, or lead, or tin-lead alloys having an acoustic impedance Z in the range from 0.3 to 1.7 of the acoustic impedance $Z_o$ of the emitter 1 and of the receiver 12 of the acoustic wave.

Average values of the acoustic impedance $Z_o$ (the dimensionality being $10^6$ kg/m$^2$s) of piezoelectric emitters and receivers X-shaped made of quartz crystals, lead meta-niobate, barium titanate, and lead zirconate-titanate are given in Table 1.

Table 1

| X-shaped quartz crystal | Lead meta-niobate | Barium titanate | Lead zirconate-titanate |
|---|---|---|---|
| 15.2 | 16 | 30.2 | 36.5 |

Averaged values of the acoustic impedance Z (the dimensionality being $10^6$ kg/m$^2$s) and of the velocity $C_3$ (m/s) of the sound conductors 3, 11 made of said materials are given in Table 2.

Table 2

| Material | Melted quartz | Porcelain | Silica glass | Tin | Lead | Lead-tin alloys, % | | |
|---|---|---|---|---|---|---|---|---|
| | | | | | | 25+75 | 50+50 | 75+25 |
| Z | 13 | 13.5 | 15 | 24.2 | 24.6 | 24.3 | 24.4 | 24.5 |
| $C_3$ | 5,570 | 5,600 | 5,500 | 3,320 | 2,160 | 3,030 | 2,740 | 2,450 |

This makes it possible to broaden considerably the spectrum of the wave of acoustic vibrations and, consequently, to decrease the errors caused by the variable cross-section of the wall 4 of the reservoir 5.

The temperature of the sound conductors 3, 11 and, consequently, the velocity $C_3$ of propagation of the waves 2, 13 of acoustic vibrations change with the temperature of the wall 4 of the reservoir 5. As a result, the conditions (1) and (7) of the primary and secondary excitation of the mechanical vibrations 10, 38 (FIGS. 11, 12) in the wall 4 of the reservoir 5 are disturbed, and additional temperature errors in the control the interface 8 (FIG. 1) arise.

These errors are diminished by resorting to a particular design of the sound conductors 3, 11, said conductors in the subsequent embodiments of the device presented in FIGS. 14–20 being described with reference to one sound conductor 3 as an example.

The shape of the sound conductors 3 presented in FIGS. 14–20 is similar to that of the sound conductors presented on FIGS. 3, 4, 6, 11 and 12.

However, the sound conductor 3 in the embodiments shown in FIGS. 14–20 is made on the basis of aqueous solutions of alcohols or alkalies, or acids, or salts of inorganic acids having an approximately parabolic temperature dependence of the velocity $C_3$ of propagation of the wave 2 of acoustic vibrations, the concentration of said solutions being so selected that the maximum value $C_{3max}$ of the velocity of propagation of the wave 2 lie in the range of the mean temperature $t_o$ of the wall 4 of the reservoir 5.

Given below is Table 3 which presents the values of $C_{3max}$ and $t_o$ for water and for a number of aqueous solutions of various media: sulphuric acid $H_2SO_4$, nitric acid $HNO_3$, or hydrochloric acid $HCl$, alkali $NaOH$, ethyl alcohol $C_2H_5OH$, zinc sulphate $ZnSO_4$, formamide $HCONH_2$, and acetonitrile $CH_3CN$ with a weight concentration $q$, which have said parabolic temperature dependence as to the velocity of propagation of the wave 2 of acoustic vibrations therein.

Table 3

| Medium dissolved in water | $H_2O$ | $H_2SO_4$ | | $HNO_3$ | | $HCl$ | | $NaOH$ | |
|---|---|---|---|---|---|---|---|---|---|
| q, % | 0 | 33 | | 20 | 27 | 24 | 30 | 8 | 12 |
| $t_o$, °C | 74 | 30 | | 50 | 30 | 50 | 30 | 50 | 30 |
| $C_3$ max, m/s | 1,555 | 1,565 | | 1,520 | 1,525 | 1,530 | 1,510 | 1,760 | 1,860 |

| Medium dissolved in water | $C_2H_5OH$ | | $ZnSO_4$ | | $HCONH_2$ | | $CH_3CN$ | |
|---|---|---|---|---|---|---|---|---|
| q, % | 12.5 | 16 | 6.7 | 12 | 20 | 36.5 | 10 | 17 |
| $t_o$, °C | 40 | 20 | 60 | 40 | 50 | 30 | 50 | 30 |
| $C_3$ max, m/s | 1,580 | 1,605 | 1,630 | 1,665 | 1,565 | 1,575 | 1,550 | 1,545 |

Figure 14:
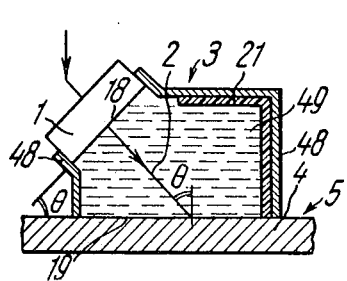
FIG. 14 shows a section of a reservoir wall with an emitter of a wave of acoustic vibrations mounted on said section with the aid of a sound conductor made in accordance with a seventh embodiment of the invention (in partial longitudinal section)
Figure 17:
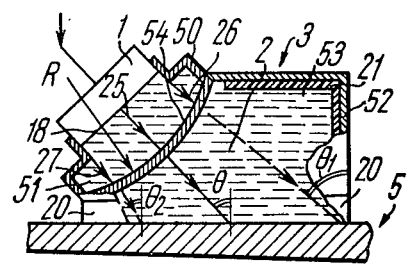
FIG. 17 shows a section of a reservoir wall with an emitter of a wave of acoustic vibrations mounted on said section with the aid of a sound conductor made in accordance with a tenth embodiment of the invention (in partial longitudinal section)
Figure 18:
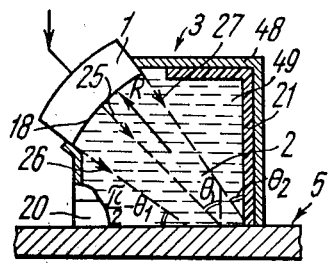
FIG. 18 shows a section of a reservoir wall with an emitter of a wave of acoustic vibrations mounted on said section with the aid of a sound conductor made in accordance with an eleventh embodiment of the invention (in partial longitudinal section)
Figure 19:
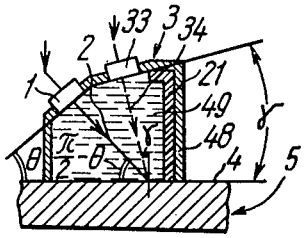
FIG. 19 shows a section of a reservoir wall with an emitter of a wave of acoustic vibrations mounted on said section with the aid of a sound conductor made in accordance with a twelth embodiment of the invention, (in partial longitudinal section)
Figure 20:
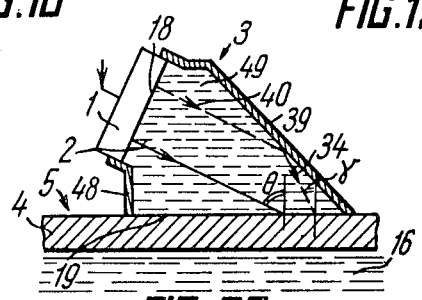
FIG. 20 shows a section of a reservoir wall with an emitter of a wave of acoustic vibrations mounted on said section with the aid of a sound conductor made in accordance with a thirteenth embodiment of the invention (in partial longitudinal section).

The sound conductors 3 shown in FIGS. 14, 18, and 20 consist of a hollow body 48 filled with an aqueous solution 49 of a compound selected from Table 3, the compound having said parabolic temperature dependence as to the velocity of propagation of the wave 2 of acoustic vibrations. In the sound conductors shown in FIGS. 14, 18, and 19 the layer 21 made of a material absorbing acoustic waves, is located on the inner surface of the hollow body 48. The emitter 1 of the wave 2 of acoustic vibrations is located in the body 48 at a prescribed angle and appropriately sealed. If an aqueous solution of acids and alkalies is used as the aqueous solution 49, the effective area of the emitter 1 has a coating which is chemically protective and acoustically non-absorbing (not shown in FIGS. 14–20). Tetrafluoroethylene polymer can be used as such coating.

Figure 15:
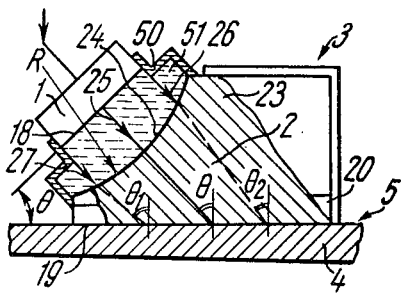
FIG. 15 shows a section of a reservoir wall with an emitter of a wave of acoustic vibrations mounted on said section with the aid of a sound conductor made in accordance with an eighth embodiment of the invention (in partial longitudinal section)

In the sound conductor 3 shown in FIG. 15, similar to the sound conductor 3 shown in FIG. 4, a part of this sound conductor, where the emitter 1 is placed, is made as a hollow body 50 filled with an aqueous solution 51 of a compound selected from Table 3. The contact part of the sound conductor 3 contacting the wall 4 of the reservoir 5 is made of a compound selected from Table 2.

Figure 16:
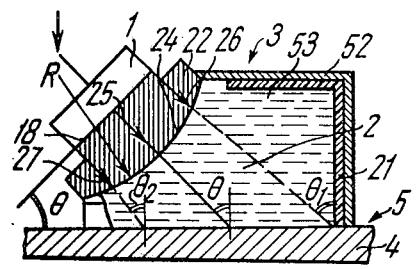
FIG. 16 shows a section of a reservoir wall with an emitter of a wave of acoustic vibrations mounted thereon with the aid of a sound conductor made in accordance with a ninth embodiment of the invention (in partial longitudinal section)

In the sound conductor 3 in FIG. 16, also similar to the sound conductor 3 shown in FIG. 4, the contact part of the sound conductor 3, contacting the wall 4 of the reservoir 5, consists of a hollow body 52 filled with an aqueous solution 53 selected from Table 3, the part of the sound conductor where the emitter 1 is placed being made of a material selected from Table 2.

In the sound conductor 3 presented in FIG. 17, also similar to the sound conductor shown in FIG. 4, both parts of the sound conductor 3 have separate bodies 50 and 52 filled with aqueous solutions 51 and 53, respectively, the velocities of the acoustic wave in said solutions having different values $C_4$ and $C_5$, respectively. Both parts of the sound conductor 3 are separated by an acoustically conducting partition 54 having a radius of curvature R, said radius being determined from the relationship (3). As a partition use can be made of a part of a hollow cylinder with said radius R of its inner surface, the cylinder being made of tetrafluoroethylene polymer. The thickness of the partition 54 is adapted to be by an order of magnitude less than the length of the wave 2 of acoustic vibrations.

In the contact parts of the sound conductors 3 shown in FIGS. 16 and 17, the inner surfaces of the hollow bodies 52 are also coated with a layer 21 of a material absorbing acoustic waves.

Figure 6:
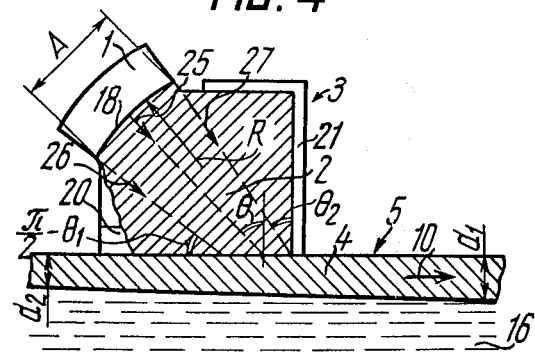
FIG. 6 shows a section of a reservoir wall with an emitter of a wave of acoustic vibrations mounted on said section with the aid of a sound conductor made in accordance with a third embodiment of the invention (in partial longitudinal section)

The sound conductors 3 presented in FIGS. 18, 19, and 20 and similar to the embodiments of the sound conductors 3 shown in FIGS. 6, 11, and 12, comprise a body 48 filled with an aqueous solution 49 of a compound selected from Table 3 as in the case of the embodiments described above.

All the above-cited embodiments of the device can be successfully used for determining the liquid-liquid interface.

The method of controlling a gas-liquid or liquid-liquid interface in monolayer reservoirs is accomplished with the above-cited embodiments of the device in the following way.

A wave 2 of acoustic vibrations is excited with the help of an emitter 1 (FIGS. 1, 2, 3) and introduced through a sound conductor 3 contacting wall 4 of a monolayer reservoir 5 into the reservoir 5 filled with two media 6 (FIG. 1) and 7 having an interface 8. The wave 2 is introduced within a section 9 of the reservoir 5, said section being located at a prescribed level, the presence of the interface 8 at this level being controlled by the proposed device.

Prior to introducing the wave 2 of acoustic vibrations into the reservoir 5, the front of the wave 2 of acoustic vibrations is oriented in the sound conductor 3 at an acute or obtuse angle $\theta$ (FIG. 3) with respect to the wall 4 of the monolayer reservoir 5 and mechanical vibrations 10 are excited by said wave within the section 9 of the wall 4, said mechanical vibrations propagating along the wall 4 in the direction determined by the direction of propagation of the wave 2 of acoustic vibrations and by the angle $\theta$ of its entry. In the embodiments of the device shown in FIGS. 3-20 the angle $\theta$ between the front of propagation of the wave 2 of acoustic vibrations and the direction of propagation of the mechanical vibrations 10 being excited is always acute. The angle $\theta$ can be obtuse under quite definite conditions, namely, when the mechanical vibrations 10 being excited propagate in the direction opposite to that shown in FIGS. 3-20.

When orienting the wave 2 of acoustic vibrations the velocity $C_7$ of its wake along the wall 4 of the reservoir 5 is set to by approximately equal to the velocity C of propagation of mechanical vibrations 10 along said wall 4:

$$C_7 = C_3/\sin \theta \simeq C, \qquad (12)$$

where $C_3$ is the velocity of propagation of the wave 2 of acoustic vibrations in the sound conductor 3.

The required value of the velocity $C_7$ of the wake of the waves 2, 13 is set by appropriately selecting the value of the angle of entry $\theta$ and the material of the sound conductor 3. The angle of entry $\theta$ of the wave 2 of acoustic vibrations into the wall 4 of the reservoir 5 corresponds to the angle of inclination of the effective area 18 of the sound conductor 3 to its contact area 19, contacting the wall 4.

The emitter 1 is excited by electric oscillations either continuous or pulse-amplitude modulated, said electric oscillations being produced by the generator 14.

Mechanical vibrations 10, while propagating along the wall 4 of the reservoir 5, undergo amplitude attenuation, this ampliude attenuation being dependent on the acoustic impedance of a medium 16 contacting the inner surface of the vibrating section 9 of the wall 4. If this medium is gaseous, the amplitude attenuation is minimum; in the event of a liquid medium the amplitude attenuation is maximum . If there are two liquids in the reservoir 5, the attenuation of the mechanical vibrations is greater for the liquid having a higher acoustic impedance.

When mechanical vibrations 10 reach the zone of location of the sound conductor 11 they become partially transformed into the acoustic wave 13 propagating in the sound conductor 11 at an angle to the contact area 19 equal to $\pi/2 - \theta$; this means that they propagate in the direction of the normal to the effective area 18 where the receiver 12 is placed. Said receiver converts the wave 13 into electric signals with an amplitude proportional to that of the mechanical vibrations 10 in the zone of location of the sound conductor 11. Electric signals from the receiver 12 come to the input of an amplifier 15. The amplified electric signals carrying information concerning the degree of attenuation of the mechanical vibrations 10 within the section 9 of the wall 4 of the reservoir 5 and, consequently, concerning the interface 8 (FIG. 1) arrive to the input of the recorder 17 (FIG. 3). The interface 8 (FIG. 1) is ascertained from the amplitude of the amplified electric signals, which is proportional to the amplitude of the acoustic wave 13 (FIG. 3) transformed from the mechanical vibrations 10 propagating along the wall 4 of the reservoir 5.

In particular, if the amplitude of the electric signals being recorded is maximum, the gas-liquid interface 8 (FIG. 1) is below the section 9; if the amplitude is minimum, the interface is above said section. When the controlled interface 8 is liquid-liquid, the above considered cases are relevant to liquids one of which has a lower acoustic impedance than the other.

A jump or sudden change in the amplitude of the electric signals being recorded indicates that the interface 8 is at the level of the vibrating section 9 of the wall 4 of the reservoir 5, with the emitter 1 and the receiver 12 of the acoustic wave mounted on said section 9 with the aid of the sound conductors 3. This change in the amplitude can be recorded automatically by a recording mechanism or a relay block of the recorder 17 (FIG. 3), depending on its particular design.

The above-described method of controlling a gas-liquid or liquid-liquid interface is technologically simple and makes possible effective control when the cross-section of the wall 4 of the reservoir 5 is constant. A variation of said cross-section changes the velocity C of propagation of mechanical vibrations 10 along the wall 4 and, consequently, disturbs the equality between said velocity of propagation of mechanical vibrations and the velocity $C_7$ of the wake of the introduced wave 2 of acoustic vibrations. This, in turn, causes a decrease in the amplitude of the mechanical vibrations 10 being excited in the wall 4 and, consequently, in the amplitude of the informative electric signal, thus leading to control errors.

To reduce such kind of errors, one should use the method of controlling the gas-liquid or liquid-liquid interface with the help of the device presented in FIG. 3 in combination with the embodiments of the sound conductors shown in FIGS. 4-9.

According to the first embodiment of the method, the section 9 of the wall 4 of the monolayer reservoir 5 is excited by a divergent or a convergent wave 2 of acoustic vibrations, the maximum and minimum angles $\theta_1$ and $\theta_2$ of entry of said wave 2 being selected from the relationship (2). For each thickness of the wall 4 (FIG. 4) within the range of from $d_1$ to $d_2$ and the respective velocities C of propagation of mechanical vibrations 10 within the range from $C_1$ to $C_2$, there is an angle of entry $\theta$ lying in the range of from $\theta_1$ to $\theta_2$ and satisfying condition (1) of the optimum excitation of mechanical vibrations 10.

A divergent wave in the range of angles from $\theta_1$ to $\theta_2$ is formed from the wave 2 of the emitter 1 on a cylindrical contact surface 24 of two parts 22 and 23 of the sound conductor 3, said cylindrical surface having the curvature radius R. Central ray 25 of the wave 2 passes through the surface 24 without refraction and enters the wall 4 at an angle $\theta$ equal to the angle of inclination of the effective area 18 of the sound conductor 3 to the contact area 19 of said sound conductor. Side rays 26 and 27 of this wave 2 are refracted since they fall on the surface 24 not perpendicularly but at an angle $\epsilon$ to the normal, said angle $\epsilon$ being determined by the relationship:

$$\text{Sin } \epsilon = A/2R, \tag{13}$$

where A is the length of the effective area 18 of the sound conductor 3 (or of the emitter 1 and, correspndingly, of the receiver 12 (FIG. 3) in a plane passing through a line coincident with the direction of propagation of mechanical vibrations 10 excited in the wall 4 of the reservoir 5 and through the normal to this area 18.

After refraction on the cylindrical surface 24 (FIG. 4) the rays 26 and 27 propagate in the second part 23 of the sound conductor 3 at an angle $\epsilon_1$ with respect to the normal to this area 24:

$$\epsilon_1 = \text{arc Sin }((C_5/C_4)\text{ Sin}\epsilon) = \text{arc Sin }(AC_5/2C_4R), \tag{14}$$

where $C_4$ and $C_5$ are the velocities of propagation of the wave 2 of acoustic vibrations in the parts 22 and 23 of the sound conductor 3, and enter the wall 4 at angles $\theta_1$ and $\theta_2$ determined by the relationships:

$$\theta_1 = \theta - \text{arc Sin }(A/2R) + \text{arc Sin }(AC_4/2C_5R), \tag{15}$$

$$\theta_2 = \theta - \text{arc Sin }(AC_5/2C_4R) + \text{arc Sin }(A/2R) \tag{16}$$

In order that the maximum and minimum angles $\theta_1$ and $\theta_2$ of the wave after the refraction correspond to the required divergence or convergence of the wave, the radius R of the curvature of the cylindrical surface 24 of contact between the parts 22 and 23 in both sound conductors 3 and 11 (FIG. 3) is selected from the relationship (3) satisfying the condition (2) and the expressions (15) and (16). FIG. 4 illustrates an example of a divergent wave 2 when $C_4 > C_5$. If $C_4 < C_5$, the wave 2 will be convergent.

Figure 7:
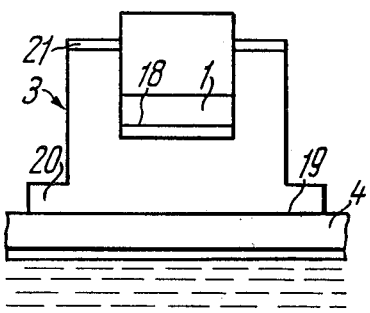
FIG. 7 is a side view of the same section shown in FIG. 6.

In the accomplishment of the first embodiment of the above-described method, which eliminates errors associated with diminishing of the informative electric signal, in the given embodiment of the device the making of the sound conductors 3 and 11 with a cylindrical contact surface 24 is rather sophisticated. A simpler design of the sound conductors 3, 11 is resorted to in another embodiment of the device, which is shown in FIGS. 6 and 7.

In this embodiment the sound conductors 3, 11 have a cylindrical effective area 18, while the emitter 1 and receiver 12 (FIG. 3) of the acoustic wave 13 have effective areas similar to the effective areas 18 of the sound conductors 3, 11, this ensuring divergence or convergence of the wave 2, 13 of acoustic vibrations. Divergence of the wave 2 takes place when the effective area 18 of the sound conductor 3 is concave and convergence (shown in FIG. 6) takes place when this area is convex. The central ray 25 of the wave 2 enters the wall 4 at an angle $\theta$ equal to the angle between the tangent to the center of the effective area 18 and the contact area 19 of the sound conductor 3. Side rays 26 and 27 of the wave 2 enter the wall 4 at angles $\theta_1$ and $\theta_2$ which are greater or smaller, respectively, than the angle $\theta$ by the value $\epsilon$ determined by the relationship (13):

$$\theta_1 = \theta + \text{arc Sin }(A/2R), \tag{17}$$

$$\theta_2 = \theta - \text{arc Sin }(A/2R) \tag{18}$$

For the angles $\theta_1$ and $\theta_2$ determined by these relationships (17) and (18) to satisfy the condition (2) of the required convergence or divergence of the wave 2, the length A of the effective area 18 of the sound conductor 3 (or of the emitter 1 and, correspondingly, of the receiver 12) should be selected in accordance with the relationship with the radius R of the curvature of the effective area 18 given in (4).

The device shown in FIGS. 6 and 7 makes it possible to diminish the above-stated errors when controlling the interface 8 (FIG. 1) by making the effective areas 18 of the sound conductors 3, 11 cylindrical, without any limitations as to the length of the wave 2 of the acoustic vibrations.

Figure 8:
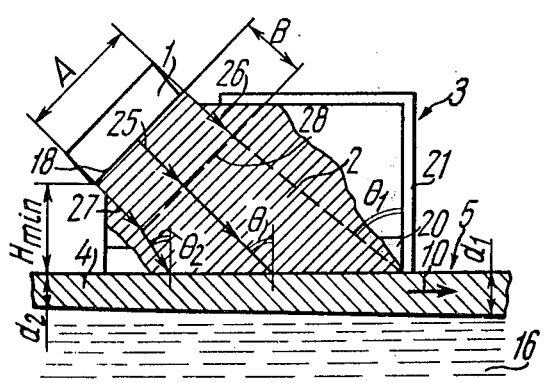
FIG. 8 shows a section of a reservoir wall with an emitter of a wave of acoustic vibrations mounted on said section with the aid of a sound conductor made in accordance with a fourth embodiment of the invention (in partial longitudinal section)
Figure 9:
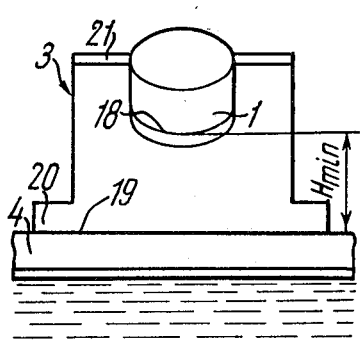
FIG. 9 is a side view of the same section shown in FIG. 8.

The embodiment of the device with the sound conductor 3 shown in FIGS. 8 and 9 is simpler as compared to the above-considered embodiments, though calls for certain limitations as far as the length $\lambda$ of the wave 2 of acoustic vibrations is concerned.

In this embodiment of the device the minimum distance $H_{min}$ between the effective area 18 and the contact area 19 of the sound conductor 3 is selected according to the relationship (6) so that the path of propagation of the side ray 27 should exceed the length B of the Fresnel zone in the acoustic field of the emitter 1, within which the wave 2 has a plane front 28 of non-divergent vibrations. Leaving this zone, the plane front 28 of the wave 2 is transformed into a partially spherical front with a divergent bundle of acoustic rays 26 and 27, the side rays entering the wall 4 at angles $\theta_1$ and $\theta_2$, respectively, $\theta_1$ being smaller and $\theta_2$ greater than the angle $\theta$ of the entry of the central ray 25.

At a sufficiently great distance from the boundary of the Fresnel zone, the angle of divergence of the wave 2 is determined by the directivity pattern of the emitter 1 and almost all the energy of acoustic emission is confined within this angle of divergence which is equal to $$\theta_1 = \theta_2 = 14 \text{ arc Sin } (K_1\lambda/A), \qquad (19)$$

where $k_1$ is a coefficient determined by the shape of the effective area 18 of the sound conductor 3, equal, for example, to 1.22 for a spherical and to 1 for a rectangular shape. Therewith, the angles $\theta_1$ and $\theta_2$ are determined by the following equations:

$$\theta_1 = \theta + 0.7 \text{ arc Sin } (K_1\lambda/A), \qquad (20)$$

$$\theta_2 = \theta - 0.7 \text{ arc Sin } (K_1\lambda/A) \qquad (21)$$

The solution of the set of equations (2), (20), and (21) gives the relationship (5) between the length A of the effective area 18 and the wavelength $\lambda$, said relationship ensuring the required divergence of the wave 2 and, consequently, optimum excitation of the section 9 (FIG. 3) of the wall 4 of the reservoir 5 within the range from $C_1$ to $C_2$ of the velocities of propagation of the mechanical vibrations 10.

The device shown in FIG. 3 and its embodiments with different designs of the sound conductors 3 in FIGS. 4–9 have a simple electronic channel allowing for the control to be performed when the amplitude instability (with respect to time) of the electric oscillations of the generator 14 is small, said oscillations being used for excitation of the emitter 1. Changes in the amplitude of the electric oscillations of the generator 14 require either periodic readjustment of the recorder 17 or varying of the gain factor of the amplifier 15, which affects the efficiency and stability of the control.

Figure 10:
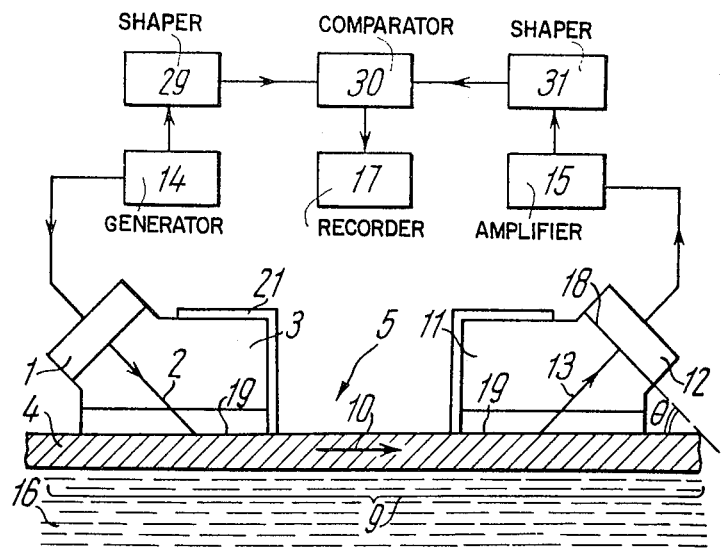
FIG. 10 shows the same device as shown in FIG 3, with an electronic channel for the passage of a reference signal in the electric circuit of the proposed device according to the invention.

The use of the device shown in FIG. 10 can enhance both the efficiency and stability of the control of gas-liquid or liquid-liquid interface.

In this embodiment of the device a reference electric signal in an analog or discrete form is shaped by the shaper 29 from the electric oscillations of the generator 14; an informative electric signal is shaped in the same form by the shaper 31 from electric signals of the amplifier 15; said reference and informative electric signals are compared in the comparison block 30. The output signal of the comparison block 30, which is proportional to the difference or to the ratio between the signals compared, goes to the recorder 17. Since the amplitude instability of the electric signals of the generator 14 equally affects the value of the informative and of the reference signals, the results of the interface control practically do not depend on said instability.

The described device in combination with the sound conductors (FIGS. 4–9) is very efficient in the event of various amplitude instabilities of the electric oscillations of the generator 14 and when the velocity C of the mechanical vibrations 10 of the excited section 9 of the wall 4 of the reservoir 5 changes within the range from $C_1$ to $C_2$. However, the amplitude of mechanical vibrations 10 (FIG. 10) changes when the conditions of entry of the wave 2 into the wall 4 through the contact surface 19 of the sound conductor 3 vary during stationary operation of the device or during rapid control of the interface 8 (FIG. 1). Such variations in the conditions of entry may be caused, for example, by different thickness of the contact grease between the contact area 19 of the sound conductors 3 and 11 and the wall 4 of the reservoir 5, roughness on the surface of the wall 4 during the rapid control, as well as by cracking, stripping off, and partial destruction of the contact layer which bonds together the contact area 19 of the sound conductors 3, 11 and the wall 4 of the reservoir 5 during the stationary control of the interface. Said variations require periodic readjustment of the shaper 31 of the informative electric signal, and the moments of readjustment can bring about significant errors in the interface control.

It is possible to diminish such errors by employing the method of controlling gas-liquid or liquid-liquid interface accomplished with the use of the devices shown in FIGS. 11 and 12.

According to this method of controlling the interface, within the section 9 of the wall 4 of the reservoir 5, the mechanical vibrations 38 are again excited by the wave 34 of acoustic vibrations, the attenuation of said mechanical vibrations being different from the attenuation of mechanical vibrations 10 excited by the primary wave 2. In this case a change in the conditions of entry of the waves 2 and 34 into the wall 4 as well as a change in the amplitude of the electric oscillations of the generator 14 cause similar variations in the amplitudes of the primary and secondary mechanical vibrations 10, 38. In a similar way, a change in the parameters of the contact area 19 in the sound conductor 11 causes a similar change of the acoustic wave 13 transformed from the mechanical vibrations 10 primarily excited within the wall 4, and of the acoustic wave 36 transformed from the mechanical vibrations again excited in the wall 4. Owing to the above, it is possible to ascertain the interface 8 (FIG. 1) between the media 6 and 7 from the relationship between the amplitudes of the mechanical vibrations 10 (FIGS. 11 and 12) and 38, excited by the primary and secondary waves 2 and 34 of acoustic vibrations, irrespective of changes in the conditions determined by the entry of the waves 2 and 34 through the contact area 19 in the sound conductor 3 and by the transformation on the contact area 19 of the sound conductor 11.

In the device shown in FIG. 11, the wave 34 is introduced into the wall 4 for a secondary excitation of mechanical vibrations 38 with the help of an additional emitter 33. The additional emitter 33 is oriented in such a way that its effective area, coinciding with the additional effective area 32 of the sound conductor 3, makes an angle $\gamma$ with the contact area 19, said angle $\gamma$ being selected from the relationship (7) satisfying the condition of equality of the velocity of the wake of the wave 34 to the velocity of mechanical vibrations 38. The wave 34 is introduced into the wall 4 at said angle $\gamma$.

Acoustic wave 13, transformed from the primarily excited mechanical vibrations 10, propagates at an angle $\theta$ with respect to the normal to the contact area 19 and enters the main receiver 12 along the normal to its effective area. Acoustic wave 36 transformed from the mechanical vibrations 38 secondarily excited in the wall 4, propagates in the sound conductor 11 at an angle $\gamma$ with respect to the normal to its contact area 19 and enters the additional receiver 35 along the normal to its effective area.

From the electric signals of the main receiver 12 which have passed through the main amplifier 15, the shaper 31 shapes(in a discrete or an analog form) an informative electric signal with an amplitude proportional to that of the primarily excited mechanical vibrations 10 which entered the zone of location of the sound conductor 11. Another shaper 29 shapes a reference electric signal from the electric signals which have come from the additional receiver 35 and passed through the additional amplifier 37, the amplitude of said reference electric signal being proportional to the amplitude of mechanical vibrations 38 again excited in the zone of location of the sound conductor 11. Both reference and informative electric signals of the shapers 29 and 31 are equally affected by instabilities arising within the contact area 19 of the sound conductor 3 upon introduction of the waves 2 and 34 of acoustic vibrations and within the contact area 19 of the sound conductor 11 upon transformation of the primarily and secondarily excited mechanical vibrations 10, 38 into the acoustic waves 13 and 36, respectively. Owing to this, the output signal of the comparison block 30, produced from the informative and reference signals entering said block, is proportional to the ratio between said signals and does not depend on the above-stated instabilities.

Since mechanical vibrations 10, 38 produced by the primary and secondary excitations have different attenuation in the wall 4 of the reservoir 5 caused by partial leakage of their energy into the medium 16, contacting the inner surface of the vibrating section 9 of said wall 4, the output signal of the comparison block 30 provides unambiguous information concerning the location of the interface 8 (FIG. 1) between the media 6 and 7 in the reservoir 5 being controlled, this information being recorded by the recorder 17.

Combination of the zones of entry of the main and additional waves, 2, 34 of acoustic vibrations within the contact area 19 of the sound conductor 3, as well as combination of the zones of transfromations of mechanical vibrations 10, 38, produced by the primary and secondary excitation, into the main acoustic wave 13 and into the additional acoustic wave 36 within the contact area 19 of the sound conductor 11, are attained by selecting the distance E between the projections of the centres of the main and additional effective areas 18, 32 onto the contact area 19 and the heights $H_1$ and $H_2$ from the contact area 19 to these centres in accordance with the relationship (8).

Although the present device eliminates effectively the influence of the above-stated instabilities the and the electronic channel of the device is comparatively simple, changes are possible in the transforming properties of the emitters, and this may lead to corresponding errors.

Such errors can be diminished by realizing the described method accomplished with the use of the device shown in FIG. 12, which employs one emitter 1, one receiver 12, and a more sophisticated electronic channel. In this case an additional wave 34, introduced at an angle $\gamma$ into the wall 4 and used for secondary excitation of mechanical vibrations 38 in said wall 4, is created by reflecting one part of a wave 40 of the emitter 1 of acoustic vibrations from a reflector area 39 of the sound conductor 3, said reflector area making an angle $\beta$ with the effective area 18, the angle $\beta$ being determined from the relationship (7) and (9) as $\pi/2 + \gamma - \theta$. Another part of the wave 2 from the emitter 1 is introduced into the wall 4 at an angle $\theta$ and is used for primary excitation of mechanical vibrations 10 in the wall 4 within the section 9. In the sound conductor 11 the primarily excited mechanical vibrations 10 are transformed into the main acoustic wave 13 propagating at an angle $\theta$ with respect to the normal to the contact area 19 of said sound conductor. The seconarily excited mechanical vibrations 38 are transformed in the sound conductor 11 into the acoustic wave 36 propagating at an angle $\gamma$ with respect to the normal to the contact area 19 in the direction to wards the reflector area 39. The wave 36 is reflected from said reflector area and, as an additional acoustic wave 41, enters the receiver 12 along the normal to its effective area.

The secondarily excited mechanical vibrations 38 have the velocity $C_6$ of propagation along the wall 4, said velocity being different from the velocity C of the primarily excited mechanical vibrations 10 (in the embodiment of the device shown in FIG. 12 $C_6 > C$). Therefore, with a path of propagation of mechanical vibrations 10 along the wall 4 considerably exceeding the front of the emitted wave 2, the main and the additional acoustic waves 13 and 41 enter the receiver 12 with a time shift $\Delta \tau$ with respect to each other, said shift essentially exceeding the duration $\tau$ of the pulse-amplitude modulated electric oscillations of the generator 14 entering the emitter 1. Owing to this, the main and additional electric pulse signals of the receiver 12, having their amplitudes proportional to the amplitudes of the primarily and secondarily excited mechanical vibrations 10 and 38, are separated in time.

Pulse signals of the receiver 12 through the common amplifier 15 come to inputs of the selection blocks 42 and 43, whose controlled inputs are fed with selecting pulses from the output of the shaper 44. The selecting pulse coming to the selection block 42 corresponds to the time position of the main pulse signal, and the selecting pulse coming to the block 43 corresponds to the time position of the reference pulse signal. The main and additional electric signals separated in the selection blocks 42 and 43, respectively, come to the shaper 31 adapted to shape an informative electric signal and to the shaper 29 adapted to shape a reference electric signal, and then they are fed to the inputs of the comparison block 30. From the output of this block, the signal carrying unambiguous information concerning the interface being controlled comes to the recorder 17.

The above-disclosed method of controlling interface in monolayer reservoirs provides highly accurate and stable control in the course of long-term operation. At the same time this method makes it possible to diminish the errors caused by instabilities occurring when the wave of acoustic vibrations is introduced into the wall of the reservoir and when the mechanical vibrations excited within the reservoir wall are transformed into an acoustic wave in the zone of the contact area of the sound conductor on which the receiver is mounted. However, in the method above-described errors may take place as a result of changes in the frequency of the mechanical vibrations within the excited section of the reservoir wall, associated with different locations of the interface in this reservoir.

These errors can be diminished when the method of controlling gas-liquid or liquid-liquid interface in monolayer reservoirs is accomplished with the use of the device shown in FIG. 13.

With this method, the section 9 of the wall 4 of the reservoir 5 is periodically excited with a pulse wave 2 of acoustic vibrations, the spectrum of said wave being selected from a range exceeding the frequency range of mechanical vibrations 10 of the wall 4 of the reservoir 5 with the interface 8 (FIG. 1) between the media 6 and 7 being found in different positions with regard to the vibrating section 9 (FIG. 13) of the wall 4. Wide-spectrum pulses produced the shaper 45 and passed through the power amplifier 46 act upon the emitter 1. These pulses have a form of rectangular video-pulses with a duration $\tau_0$, said duration being determined by the relationship (10). As a result, the emitter 1 emits into the sound conductor 3 a spectrum of ultrasonic vibrations, covering all the values of the varying frequencies of mechanical vibrations 10 in the wall 4 with the interface 8 (FIG. 1) being found in different positions.

A pulse signal of the receiver 12, transformed by said receiver from the acoustic wave 13 (FIG. 13) which in turn is transformed from the mechanical vibrations 10 entering the zone of the contact area 19 of the sound conductor 11, has an amplitude of electric oscillations filling said pulse signal (the shape these electric oscillations being similar to the received pulse acoustic wave 13) depending on the position of the interface 8 (FIG. 1) being controlled. Besides, the frequency $f$ of the filling electric oscillations depends on the type of the medium 16 (FIG. 13) contacting the vibrating section 9 of the wall 4 of the reservoir 5.

Said frequency $f$ is recorded in block 47 adapted to measure the frequency of electric signals, the signal being fed to said block 47 from the receiver 12 through the amplifier 15. The frequency thus measured is used for ascertaining the type of liquid (characterized, for example, by the value of its acoustic impedance) when the interface 8 (FIG. 1) is found above or below the vibrating section 9 of the wall 4 (FIG. 13) of the reservoir 5.

An informative signal is shaped in shaper 31 adapted to shape an informative electric signal, from pulse signals of the receiver 12, these pulse signals being fed to said shaper 31 through the amplifier 15. The amplitude of said informative signal thus formed is proportional to the amplitude of the pulse signals. A reference electric signal is shaped from the video-pulses, taken from the output of the power amplifier 46, in shaper 29. Said reference signal and the informative electric signal come to the comparison block 30. The output signal of this block 30 furnishes information concerning the interface 8 (FIG. 1) being controlled and is recorded by recorder 17 (FIG. 13).

The above-described embodiment of the method effectively reduces the influence of changes in the frequency of mechanical vibrations, caused by different positions of the interface being controlled, and ensures additional control of the type of liquid when the cross-section of the wall section being excited is constant. However, errors may arise when said cross-section varies considerably, thus causing a change in the frequency of mechanical vibrations within a wider range than in the event of changes in the interface position in the reservoir.

These errors are reduced when the method of controlling gas-liquid or liquid-liquid interface is accomplished in the device also shown on FIG. 13.

According to this method, section 9 of the wall 4 of the reservoir 5 is periodically excited by a pulse wave 2 of acoustic vibrations, the relative width of the spectrum of said wave being selected in accordance with relationship (11) equal to or exceeding the relative variation in the thickness of the vibrating section 9 of the wall 4 of the reservoir 5. This is attained by that sound conductors 3 and 11 are made of fused quartz or procelain, or silicate glass, or lead, or tin, or lead-tin alloys, having an acoustic impedance within the range from 0.3 to 1.7 of the acoustic impedance of the emitter 1 and receiver 12 of the acoustic wave. The materials from whcih the sound conductors are made are specified in Table 2.

Such design of the sound conductors 3 and 11 provides acoustic damping of the emitter 1 and of the receiver 12 with a corresponding broadening of the boundaries of the emission and reception spectra of the waves 2 and 13 of acoustic vibrations. A decrease in the acoustic impedance of the sound conductors 3 and 11, which depends on the materials of the sound conductors, with respect to the acoustic impedance of the emitter 1 and of the receiver 12 diminishes the spectrum width. The type of the material of the sound conductors 3 and 11 and, correspondingly, its impedance (see Table 2) are selected in accordance with the spectrum width required by the relationship (11).

The method instantly described ensures control of the interface and of the liquid type when the interface is located above or below the reservoir wall section being excited (in the case of a gas-liquid system the interface is above the section). However, control errors may arise because of temperature changes. The value of said errors is determined mainly by the temperature dependence of the velocity of propagation of the wave of acoustic vibrations in the sound conductors.

Temperature errors can be substantially diminished by using the devices for controlling gas-liquid or liquid-liquid interface shown in FIGS. 3–13 with the sound conductors designed as shown in FIGS. 14–20.

The reduction of temperature errors is attained by using sound conductors 3 and 11 which are made on the basis of aqueous solutions of alcohols, or alkalies, or acids, or salts of inorganic acids which have an almost parabolic dependence of the velocity $C_3$ of propagation of the acoustic wave 2, 13 on the temperature $$C_3 = C_{3\,max}[1 - (t - t_o)^2], \qquad (22)$$

where $C_{3\,max}$ is the maximum velocity of propagation of the wave 2, 13 in an aqueous solution when $t = t_o$.

Concentration $q$ of the solution so selected that the maximum value $C_{3\,max}$ of the velocity of propagation be in the region of the average temperature $t_o$ of the wall 4 of the reservoir 5. Owing to this, the velocity of the acoustic wave in the sound conductor 3 over the operating temperature range varies very little. For exmaple, when the temperature changes are $\pm 20°$ C. of its average value $t_o$, the velocity varies by no more than 0.6%. This increases essentially the accuracy of the interface control.

The above-disclosed method of controlling gas-liquid or liquid-liquid interface in monolayer reservoirs accomplished in the devices shown in FIG. 3–20 provides a highly effective non-contact automatic control of interfaces in reservoirs during various technological processes in metallurgical, ore-dressing, chemical, petrochemical, food, stuffs and other industries.

What is claimed is:

1. A method of controlling gas-liquid or liquid-liquid interface in monolayer reservoirs, comprising the following operations: exciting a wave of acoustic vibrations; introducing said wave of acoustic vibrations through a first sound-conducting medium, which contacts a section of a wall of a monolayer reservoir into said reservoir with a simultaneous orientation of said wave in said sound-conducting medium at an angle other than 90° to said wall within said section; exciting mechanical vibrations by said wave of acoustic vibrations within said monolayer reservoir wall section, these mechanical vibrations propagating along said wall in a direction determined by the propagation of said wave of acoustic vibrations and by said angle of entry of said wave; setting, while thus orienting said wave of acoustic vibrations, of the velocity of its wake along said wall approximately equal to the velocity of propagation along said wall of said mechanical vibrations excited by said wave of acoustic vibrations; receiving an acoustic wave which has passed through a second conducting medium spaced from said first sound-conducting medium and contacting said section of said monolayer reservoir wall, said received acoustic wave being transformed from said mechanical vibrations propagating along said section of the wall and between said conducting mediums, said wall section and conducting mediums being generally disposed in a desired region relative to the position of the interface to be monitored or controlled; and determining the amplitude of said received acoustic wave, this amplitude being used for ascertaining the gas-liquid or liquid-liquid interface in said monolayer reservoir.

2. A method as claimed in claim 1, comprising the following operations; exciting said section of said wall, in the event of its cross-section being variable, by a divergent wave of acoustic vibrations; and selecting the maximum and minimum angles of entry $\theta_1$ and $\theta_2$ of said divergent wave from the relationship:

$$(\sin \theta_1 / \sin \theta_2) \geq (C_1/C_2),$$

where $\theta_1$ and $\theta_2$ are said angles of entry of said divergent wave of acoustic vibrations, said angles being determined by the direction of propagation of said wave and by the normal to said wall in the zone of entry, and $C_1$ and $C_2$ are the respective maximum and minimum velocities of propagation of said mechanical vibrations, excited by said divergent wave of acoustic vibrations, from said one section to said other section of said wall.

3. A method as claimed in claim 2, wherein said acoustic wave is a primary divergent wave of acoustic vibrations, and comprising the following operations: exciting secondary mechanical vibrations by a secondary divergent wave of acoustic vibrations within said section of said wall of said monolayer reservoir wall section, said secondary mechanical vibrations having an attenuation different from that of the mechanical vibrations excited by said primary divergent wave of acoustic vibrations; and determining the relationship between the amplitudes of said mechanical vibrations excited by said primary and said secondary divergent waves of acoustic vibrations, this relationship being used for ascertaining the gas-liquid or liquid-liquid interface.

4. A method as claimed in claim 2, comprising the following operation: periodically exciting said section of said wall of said monolayer reservoir by a pulse wave of acoustic vibrations, the spectrum of said pulse wave being selected from a range exceeding the frequency range of the mechanical vibrations excited within said section by said pulse wave of acoustic vibrations in the event of the interface being found in different positions with regard to the wall section being excited; and determining the filling frequency of said pulse acoustic wave, this filling frequency being used for additionally ascertaining the kind of liquid when the interface lies at a level other than that at which said section being excited is located.

5. A method as claimed in claim 2, comprising the following operation: exciting said section of said wall of said monolayer reservoir by a pulse wave of acoustic vibrations the relative width of the spectrum of said wave being selected to be approximately equal to the relative variation in the thickness of said section being excited.

6. A method as claimed in claim 1, comprising the following operations: exciting said section of said wall, in the event of its cross-section being variable, by a convergent wave of acoustic vibrations; and selecting the maximum and minimum angles of entry $\theta_1$ and $\theta_2$ of said wave from the relationship:

$$(\sin \theta_1 / \sin \theta_2) \geq (C_1/C_2),$$

where $\theta_1$ and $\theta_2$ are said angles of entry of said convergent wave of acoustic vibrations, said angles being determined by the direction of propagation of said wave and by the normal to the above-mentioned wall in the zone of entry, and $C_1$ and $C_2$ are the respective maximum and minimum velocities of propagation of said mechanical vibrations, excited by said convergent wave of acoustic vibrations, from said one section of said wall to said other said section of said wall.

7. A method as claimed in claim 6, wherein said acoustic wave is a primary convergent wave of acoustic vibrations, and comprising the following operations: exciting secondary mechanical vibrations by a secondary convergent wave of acoustic vibrations within said section of said wall of said monolayer reservoir, said secondary mechanical vibrations having an attenuation different from that of the mechanical vibrations excited by said primary convergent wave of acoustic vibrations; and determining the relationship between the amplitudes of said mechanical vibrations excited by said primary and secondary convergent waves of acoustic vibrations, this relationship being used for ascertaining said gas-liquid or liquid-liquid interface.

8. A method as claimed in claim 6, comprising the following operation: periodically exciting said section of said wall of said monolayer reservoir by a pulse wave of acoustic vibrations, the spectrum of said pulse wave being selected from a range exceeding the frequency range of mechanical vibrations excited within said section by said pulse wave of acoustic vibrations in the event of the interface being found in different positions with regard to said section being excited; and determining the filling frequency of said pulse acoustic wave, this filling frequency being used for additionally ascertaining the kind of liquid when said interface lies at a level other than that at which said section being excited is located.

9. A method as claimed in claim 6, comprising the following operation: exciting said section of said wall of said monolayer reservoir by a pulse wave of acoustic vibrations, the relative width of the spectrum of said wave being selected to be approximately equal to the relative variation in the thickness of said section being excited.

10. A method as claimed in claim 1, wherein said acoustic wave is a primary wave of acoustic vibrations, and comprising the following operations: exciting secondary mechanical vibrations by a secondary wave of acoustic vibrations within said section of said wall of said monolayer reservoir, said secondary mechanical vibrations having an attenuation different from that of the mechanical vibrations excited by said primary wave of acoustic vibrations; and determining the relationship between the amplitudes of said mechanical vibrations excited by said primary and secondary waves of accoustic vibrations, said relationship being used for ascertaining the gas-liquid or liquid-liquid interface.

11. A method as claimed in claim 10, comprising the following operations: periodically exciting said section of said wall of said monolayer reservoir by a pulse wave of acoustic vibrations, the spectrum of said pulse wave being selected from a range exceeding the frequency range of mechanical vibrations excited within said section by said pulse wave of acoustic vibrations in the event of the interface being found in different positions with regard to said section being excited; and determining the filling frequency of said pulse acoustic wave, this filling frequency being used for additionally ascertaining the kind of liquid when said interface lies at a level other than that at which said section being excited is located.

12. A method as claimed in claim 10, comprising the following operation: exciting said section of said wall of said monolayer reservoir by a pulse wave of acoustic vibrations, the relative width of the spectrum of said pulse wave selected to be approximately equal to the relative variation in the thickness of said section being excited.

13. A method as claimed in claim 1, comprising the following operations: periodically exciting said section of said wall of said monolayer reservoir by a pulse wave of acoustic vibrations, the spectrum of said pulse wave being selected from a range exceeding the frequency range of mechanical vibrations excited within said section by said pulse wave of acoustic vibrations, in the event of the interface being located in different positions with regard to said wall section being excited; and determining the filling frequency of said pulse acoustic wave, the filling frequency being used for additionally ascertaining the kind of liquid when the interface lies at a level other than that of said reservoir wall section being excited.

14. A device for controlling gas-liquid or liquid-liquid interface in monolayer reservoirs, comprising: an emitter of a wave of acoustic vibrations mounted outside said monolayer reservoir on a section of its wall thereof; a receiver of an acoustic wave also mounted outside said monolayer reservoir on said section of said wall and spaced from said emitter and in the path of said wave of acoustic vibrations from said emitter, said emitter and receiver having effective areas; two sound conductors for respectively mounting said emitter of a wave of acoustic vibrations and said receiver of an acoustic wave on said section of said wall of said monolayer reservoir, said sound conductors having effective areas rigidly connected within the corresponding effective areas of said emitter and receiver of an acoustic wave, said sound conductors having contact areas contacting said wall within said section and making angles $\theta$ with said effective areas of said sound conductors, said angles $\theta$ being determined from the relationship:

$$\theta = \arcsin(C_3/C),$$

where $C_3$ is the velocity of propagation of said acoustic waves in said sound conductors, and
$C$ is the velocity of propagation of mechanical vibrations, excited by said wave of acoustic vibrations, along said wall of said monolayer reservoir, said sound conductors being made of a material wherein the velocity $C_3$ of propagation of said acoustic waves is less than the velocity $C$ of propagation of said mechanical vibrations along said wall of said monolayer reservoir, said wall section and sound conductors being generally disposed in a desired region relative to the position of the interface to be monitored or controlled; a generator of electric oscillations having an output coupled to said emitter of said wave of acoustic vibrations; an amplifier of electric signals having an input coupled to said receiver of an acoustic wave and having an output; a recorder of the amplitude of electric signals coupled electrically to said output of said amplifier of electric signals, this amplitude being used for ascertaining said gas-liquid or liquid-liquid interface.

15. A device as claimed in claim 14, wherein said sound conductors, in the event of the cross-section of said wall of said monolayer reservoir being variable, are made of two parts, said parts of said sound conductors being made of materials differing as to the velocity with which said wave of acoustic vibrations propagates therein, cylindrical areas of contact between said parts of said sound conductors being provided and having axes of symmetry lying in the same plane with the axes of said emitter and receiver of an acoustic wave, respectively, perpendicularly to said axes, the radius R of said cylindrical areas being determined from the relationship:

$$R \leq \frac{C_1 + C_2}{C_4 + C_5} \left| \frac{C_4 - C_5}{C_1 - C_2} \right| A \cot \theta,$$

where $C_1$ and $C_2$ are the respective maximum and minimum velocities of propagation of said mechanical vibrations along said wall of said monolayer reservoir, excited by said wave of acoustic vibrations, and
$C_4$ and $C_5$ are the velocities of propagation of said wave of acoustic vibrations in separate parts of said sound conductors, A is the length of said effective area of said sound conductors in a plane passing through a line coincident with the direction of propagation of said mechanical vibrations excited in said wall of said monolayer reservoir and through the normal to this effective area.

16. A device as claimed in claim 15, wherein said generator includes a shaper of wide-spectrum electric pulses having an output and a power amplifier of electric pulses of said generator of electric oscillations, having an input coupled to said output of said shaper of wide-spectrum electric pulses, and having an output serving as said output of said generator of electric oscillations intended for shaping a pulse wave of acoustic vibrations emitted by said emitter, said pulse wave being used for exciting mechanical vibrations in said wall of said monolayer reservoir; a shaper of an informative electric signal having an input coupled to said output of said amplifier of electric signals, and an output; a block for comparing an informative electric signal with a reference one, and having a first input coupled to said output of said shaper of an informative electric signal, and a second input, and an output coupled to said input of said recorder of the amplitude of electric signals; a shaper of a reference electric signal having an input coupled to said output of said power amplifier of electric pulses, and an output coupled to said second input of said block for comparing an informative electric signal with a reference one; a block for measuring the frequency of electric pulses having an input coupled to said output of said amplifier of electric signals.

17. A device as claimed in claim 15, wherein a body of each of said sound conductors comprises aqueous solutions of compounds selected from the group consisting of alcohols, alkalies, acids, and salts of inorganic acids, said solutions having an approximately parabolic temperature dependence of the velocity of propagation of said wave of acoustic vibrations therein, the concentration of said solutions being such that the maximum velocity of propagation of said wave of acoustic vibrations lies in the range of an average temperature of said wall of said monolayer reservoir.

18. A device as claimed in claim 14, wherein said sound conductors whose said effective areas, in the event of the cross-section of said wall of said monolayer reservoir wall is variable, are made cylindrical with a radius of curvature R being determined from the relationship:

$$R \leq \frac{C_1 + C_2}{2(C_1 - C_2)} \cdot A \cot \theta,$$

said emitter of a wave of acoustic vibrations and receiver of an acoustic wave having said effective areas thereof of a shape similar to that of said effective areas of the corresponding sound conductors where $C_1$ and $C_2$ are the respective maximum and minimum velocities of propagation of said mechanical vibrations along said wall of said monolayer reservoir, excited by said wave of acoustic vibrations, and A is the length of said effective area of said sound conductors in a plane passing through a line coincident with the direction of propagation of said mechanical vibrations excited in said wall of said monolayer reservoir and through the normal to this effective area.

19. A device as claimed in claim 18, further comprising a second emitter of a further wave of acoustic vibrations, said further wave being used to generate secondarily excited mechanical vibrations in said wall section of said monolayer reservoir, said sound conductors, each of which has a second effective area making an angle $\gamma$ with its said contact area, the $\gamma$ angle being determined from the relationship:

$$\gamma = \arcsin C_3/C_6,$$

where $C_6$ is the velocity of propagation of said secondarily excited mechanical vibrations within said wall of said monolayer reservoir, said second emitter of a wave of acoustic vibrations being mounted on a second effective area of its corresponding sound conductor; a second receiver of an acoustic wave mounted on a second effective area of its corresponding said sound conductor; a second amplifier of electric signals having an input coupled to the output of said second receiver of an acoustic wave, and an output; a shaper of a reference electric signal having an input coupled to said output of said second amplifier of electric signals, and an output; a block for comparing an informative electric signal with a reference one, said block having an input coupled to said output of said shaper of a reference electric signal, a second input, and an output coupled to said recorder of the amplitude of electric signals; a shaper of an informative electric signal, having an input coupled to said output of said first amplifier of electric signals, and an output coupled to said second input of said block for comparing an informative electric signal with a reference one, said second emitter of a wave of acoustic vibrations being coupled to said generator of electric oscillations.

20. A device as claimed in claim 19, wherein each sound conductor is made with a distance E between the projections of the centers of said first and second effective areas onto said contact area of the corresponding sound conductor, said distance being determined from the relationship:

$$E = H_1 \tan \theta - H_2 \tan \gamma$$

where $H_1$ and $H_2$ are the respective distances between the centers of said first and second effective areas and said contact area of each sound conductor.

21. A device as claimed in claim 18, wherein each of said sound conductors has a reflector area intended for reflecting said wave of acoustic vibrations and for secondary exciting mechanical vibrations by said reflected wave in said wall of said monolayer reservoir, said reflector area making an angle $\beta$ with said effective area of the corresponding sound conductor, said angle $\beta$ being determined from the relationship:

$$\beta = \pi/2 - (\theta - \arcsin C_3/C_6)$$

where $C_6$ is the velocity of propagation of said secondarily excited mechanical vibrations within said wall of said monolayer reservoir, a first block of selecting electric signals, having a first input coupled to said output of said amplifier of electric signals, a controlled input and an output; a shaper of an informative electric signal having an input coupled to said output of said first block of selecting electric signals, and an output; a block for comparing an informative electric signal with a reference one, said block having a first input coupled to said output of said shaper of an informative electric signal, a second input, and an output coupled to said recorder of the amplitude of electric signals; a second block of selecting electric signals having a first input coupled to said output of said amplifier of electric signals, a controlled input, and an output; a shaper of a reference electric signal having an input coupled to said output of said second block of selecting electric signals, and an output coupled to said second input of said block for comparing an informative electric signal with a reference one, said generator of electric oscillations being made as a generator of pulse-amplitude modulated oscillations; a shaper of selecting pulses having an input coupled to the output of said generator of pulse-amplitude modulated oscillations, and two outputs each of which is coupled to said controlled input of said first and second blocks of selecting electric signals, respectively.

22. A device as claimed in claim 21, wherein said sound conductors are made of a material having an acoustic impedance within the range of from 0.3 to 1.7 of the acoustic impedance of said emitter and receiver of a wave of acoustic vibrations, said material being selected from the group consisting of fused quartz, porcelain, silicate glass, tin, lead, or tin-lead alloys.

23. A device as claimed in claim 18, wherein said generator includes a shaper of wide-spectrum electric pulses having an output and a power amplifier of electric pulses of said generator of electric oscillations, having an input coupled to said output of said shaper of wide-spectrum electric pulses, and having an output which serves as said output of said generator of electric oscillations, said generator being intended for shaping a pulse wave of acoustic vibrations emitted by said emitter and used for exciting mechanical vibrations in said wall of said monolayer reservoir; a shaper for an informative electric signal having an input coupled to said output of said amplifier of electric signals, and an output; a block for comparing an informative electric signal with a reference one, said block having a first input coupled to said output of said shaper of an informative electric signal, and a second input, and an output coupled to said input of said recorder of the amplitude of electric signals; a shaper of a reference electric signal having an input coupled to said output of said power amplifier of electric pulses, and an output coupled to said second input of said block for comparing an informative electric signal with a reference one; a block for measuring the frequency of electric pulses, having an input coupled to said output of said amplifier of electric signals.

24. A device as claimed in claim 16, wherein a body of each of said conductors comprises aqueous solutions of compounds selected from the group consisting of alcohols, alkalies, acids, and salts of of inorganic acids, said solutions having an approximately parabolic temperature dependence on the velocity of propagation of said wave of acoustic vibrations therein, the concentration of said solutions being such that the maximum velocity of propagation of said wave of acoustic vibrations lies in the range of an average temperature of said wall of said monolayer reservoir.

25. A device as claimed in claim 14, wherein said effective areas of said sound conductors, in the event of the cross-section of said wall of said monolayer reservoir being variable, have a length A in planes passing through the normal to said effective areas and through a line coincident with the direction of propagation of said mechanical vibrations excited in said wall, said length A being determined from the relationship:

$$A \leq K \left| \frac{C_1 + C_2}{C_1 - C_2} \right| \lambda \cot \theta,$$

where $C_1$ and $C_2$ are the respective maximum and minimum velocities of propagation of said mechanical vibrations along said wall of said monolayer reservoir, excited by said wave of acoustic vibrations, and K is a coefficient determined by the shape of said effective areas of said sound conductors, $\lambda$ is the length of said wave of acoustic vibrations in said sound conductors; said effective and contact areas of said sound conductors being spaced from each other a minimum distance $H_{min}$, $H_{min}$ being determined from the relationship:

$$H_{min} > A_2/4\lambda. \cos \theta.$$

26. A device as claimed in claim 25, further comprising: a second emitter of a further wave of acoustic vibrations, said further wave being used to generate secondarily excited mechanical vibrations in said wall section of said monolayer reservoir; said sound conductors, each of which has a second effective area making an angle $\gamma$ with the contact area, said angle $\gamma$ being determined from the relationship:

$$\gamma = \arc \sin C_3/C_6,$$

where $C_6$ is the velocity of propagation of said secondarily excited mechanical vibrations in said wall of said monolayer reservoir, said second emitter of a wave of acoustic vibrations being mounted on a second effective area of its corresponding sound conductor; a second receiver of an acoustic wave mounted on a second effective area of its corresponding sound conductor; a second amplifier of electric signals having an input coupled to said output of said second receiver of an acoustic wave, and an output; a shaper of a reference electric signal having an input coupled to said output of said second amplifier of electric signals and an output; a block for comparing an informative electric signal with a reference one, said block having an input coupled to said output of said shaper of a reference electric signal, a second input, and an output coupled to said recorder of the amplitude of electric signals; a shaper of an informative electric signal, said shaper having an input coupled to said output of said first amplifier of electric signals, and an output coupled to said second input of said block for comparing an informative electric signal with a reference one, said second emitter of a wave of acoustic vibrations being coupled to said generator of electric oscillations.

27. A device as claimed in claim 25, wherein each of said sound conductors has a reflector area intended for reflecting said wave of acoustic vibrations and for secondarily exciting mechanical vibrations in said wall of said monolayer reservoir by said reflected wave, said reflector area making an angle $\beta$ with said effective area of the corresponding sound conductor, said angle $\beta$ being determined from the relationship:

$$\beta = \pi/2 - (\theta - \arc \sin C_3/C_6)$$

where $C_6$ is the velocity of propagation of said secondarily excited mechanical vibrations within said wall of said monolayer reservoir, a first block of selecting electric signals, having a first input coupled to said output of said amplifier of electric signals, a controlled input and an output; a shaper of an informative electric signal having an input coupled to said output of said first block of selecting electric signals, and an output; a block for comparing an informative electric signal with a reference one, said block having a first input coupled to said output of said shaper of an informative electric signal, a second input, and an output coupled to said recorder of the amplitude of electric signals; a second block of selecting electric signals having a first input, coupled to said output of said amplifier of electric signals, a controlled input, and an output; a shaper of a reference electric signal, having an input, coupled to said output of said second block of selecting electric signals, and an output coupled to said second input of said block for comparing an informative electric signal with a reference one, said generator of electric oscillations being made as a generator of pulse-amplitude modulated oscillations; a shaper of selecting pulses having an input coupled to said output of said generator of pulse-amplitude modulated oscillations, and two outputs each of which is coupled to said controlled input of said first and second blocks of selecting electric signals, respectively.

28. A device as claimed in claim 25, wherein said generator includes a shaper of widespectrum electric pulses having an output and a power amplifier of electric pulses of said generator of electric oscillations, having an input coupled to said output of said shaper of widespectrum electric pulses, and having an output which serves as said output of said generator of electric oscillations intended for shaping a pulse wave of acoustic vibrations emitted by said emitter and used for exciting mechanical vibrations in said wall of said monolayer reservoir; a shaper of an informative electric signal having an input coupled to said output of said amplifier of electric signals, and an output; a block for comparing an informative electric signal with a reference one, said block having a first input coupled to said output of said shaper of an informative electric signal, and a second input, and an output coupled to said input of said recorder of the amplitude of electric signals; a shaper of a reference electric signal coupled to said output of said power amplifier of electric pulses, and an output coupled to said second input of said block for comparing an informative electric signal with a reference one; a block for measuring the frequency of electric pulses having an input coupled to said output of said amplifier of electric signals.

29. A device as claimed in claim 25, wherein a body of each of said sound conductors comprises aqueous solutions of compounds selected from the group consisting of alcohols, acids, alkalies, and salts of inorganic acids, said solutions having an approximately parabolic temperature dependence of the velocity of propagation of said wave of acoustic vibrations therein, the concentration of said solutions being such that the maximum velocity of propagation of said wave of acoustic vibrations be in the range of an average temperature of said wall of said monolayer reservoir.

30. A device as claimed in claim 14, further comprising a second emitter of a further wave of acoustic vibrations, said mechanical vibrations being again excited by said further wave of acoustic vibrations within said wall of said monolayer reservoir, to generate secondarily excited mechanical vibrations; said sound conductors, each of which is made with a second effective area making an angle $\gamma$ with its said contact area, said angle $\gamma$ being determined from the relationship:

$$\gamma = \text{arc Sin } C_3/C_6$$

where $C_6$ is the velocity of propagation of said secondarily excited mechanical vibrations within said wall of said monolayer reservoir, said second emitter of a wave of acoustic vibrations being mounted on a second effective area of its corresponding sound conductor; a second receiver of an acoustic wave mounted on a second effective area of its corresponding sound conductor; a second amplifier of electric signals having an input coupled to the output of said second receiver of an acoustic wave, and an output; a shaper of a reference electric signal having an input coupled to said output of said second amplifier of electric signals, and an output; a block for comparing an informative electric signal with a reference one, said block having an input coupled to said output of said shaper of a reference electric signal, a second input and an output, said output being coupled to said recorder of the amplitude of electric signals; a shaper adapted to shape an informative electric signal, said shaper having an input coupled to said output of said first amplifier of electric signals and an output coupled to said second input of said block for comparing an informative electric signal with a reference one, said second emitter of a wave of acoustic vibrations being coupled to said generator of electric oscillations.

31. A device as claimed in claim 30, wherein each sound conductor is made with a distance E between the projections of the centers of said first and second effective areas onto said contact area of the corresponding sound conductor, said distance being determined from the relationship:

$$E = H_1 \tan \theta - H_2 \tan \gamma$$

where $H_1$ and $H_2$ are the respective distances between the centers of said first and second effective areas and said contact area of each sound conductor.

32. A device as claimed in claim 14, wherein each of said sound conductors is made with a reflector area intended for reflecting said wave of acoustic vibrations and for secondarily exciting mechanical vibrations by said reflected wave in said wall of said monolayer reservoir, said reflector area making an angle $\beta$ with said effective area of the corresponding sound conductor, said angle $\beta$ being determined from the relationship:

$$\beta = \pi/2 - (\theta - \text{arc Sin } C_3/C_6),$$

where $C_6$ is the velocity of propagation of said secondarily excited mechanical vibrations within said wall of said monolayer reservoir, a first block for selection of electric signals, having a first input coupled to said output of said amplifier of electric signals, a controlled input and an output; a shaper adapted to shape an informative electric signal, said shaper having an input, coupled to said output of said first block of selection of electric signals, and an output; a block for comparing an informative electric signal with a reference one, said block having a first input coupled to said output of said shaper of an informative electric signal, a second input, and an output coupled to said recorder of the amplitude of electric signals; a second block of selection of electric signals having a first input coupled to said output of said amplifier of electric signals, a controlled input, and output; a shaper of a reference electric signal, having an input coupled to said output of said second block of selection of electric signals, and an output coupled to said second input of said block for comparing an informative electric signal with a reference one; said generator of electric oscillations being made as a generator of pulse-amplitude modulated oscillations; a shaper of selecting pulses having an input coupled to said output of said generator of pulse-amplitude modulated oscillations, and two outputs, said outputs being coupled to said controlled input of said first and second blocks of selection of electric signals, respectively.

33. A device as claimed in claim 32, wherein said sound conductors are made of a material having an acoustic impedance within the range of from 0.3 to 1.7 of the acoustic impedance of said emitter and receiver of a wave of acoustic vibrations, said material being selected from the group consisting of fused quartz, porcelain, silicate glass, tin, lead, or tin-lead alloys.

34. A device for controlling gas-liquid or liquid-liquid interface in monolayer reservoirs, comprising: an emitter of a wave of acoustic vibrations, mounted outside said monolayer reservoir on a section of a wall thereof; a receiver of an acoustic wave also mounted outside said monolayer reservoir on said section of said wall and spaced from said emitter and in the path of said wave of acoustic vibrations from said emitter, said emitter and receiver having effective areas; two sound conductors for respectively mounting said emitter of a wave of acoustic vibrations and said receiver of an acoustic wave on said section of said wall of said monolayer reservoir, said sound conductors having effective areas rigidly connected with the corresponding effective areas of said emitter and receiver of an acoustic wave; a generator of electric oscillations having an output coupled to said emitter of a wave of acoustic vibrations, said generator including a shaper of wide-spectrum electric pulses having an output and a power amplifier of electric pulses of said generator of electric oscillations, having an input coupled to said output of said shaper of wide-spectrum electric pulses, and having an output which serves as said output of said generator of electric oscillations intended for shaping a pulse wave of acoustic vibrations emitted by said emitter and used for exciting mechanical vibrations in said wall of said monolayer reservoir; said sound conductors having contact areas contacting said wall within said section and making angles $\theta$ with said effective areas of said sound conductors, the angles $\theta$ being determined from the relationship:

$$\theta = \text{arc Sin } C_3/C$$

where $C_3$ is the velocity of propagation of said pulse acoustic waves in said sound conductors, and C is the velocity of propagation of said mechanical vibrations, excited by said pulse wave of acoustic vibrations, along said wall of said monolayer reservoir, said sound conductors being made of a material wherein the velocity $C_3$ of propagation of said pulse acoustic waves is less than the velocity C of propagation of said mechanical vibrations along said wall of said monolayer reservoir, said wall section and sound conductors being generally disposed in a desired region relative to the position of the interface to be monitored or controlled; an amplifier of electric signals having an input coupled to said receiver of an acoustic wave, and an output; a shaper of an informative electric signal having an input coupled to said output of said amplifier electric signals, and an output; a block for comparing an informative electric signal with a reference one, having a first input coupled to said output of said shaper of an informative electric signal, and a second input, and an output coupled to said input of said recorder of the amplitude of electric signals; a shaper of a reference electric signal having an input coupled to said output of said power amplifier of electric pulses, and an output coupled to said second input of said block for comparing an informative electric signal with reference one; a block for measuring the frequency of electric signals having an input coupled to said output of said amplifier of electric signals; a recorder of the amplitude of electric signals having an input coupled to said output of said block for comparing an informative electric signal with a reference one, this amplitude being used to ascertain said gas-liquid or liquid-liquid interface.

35. A device for controlling gas-liquid or liquid-liquid interface in monolayer reservoirs, comprising: an emitter of a wave of acoustic vibrations, mounted outside said monolayer reservoir on a section of a wall thereof; a receiver of an acoustic wave also mounted outside said monolayer reservoir on said section of said wall and spaced from said emitter and in the path of said wave of acoustic vibrations from said emitter, said emitter and receiver having effective areas; two sound conductors for respectively mounting said emitter of a wave of acoustic vibrations and said receiver of an acoustic wave on said section of said wall of said monolayer reservoir, said sound conductors having effective areas rigidly connected with the corresponding effective areas of said emitter and receiver of an acoustic wave, said sound conductors having contact areas contacting said wall within said section and making angles $\theta$ with said effective areas of said sound conductors, said angles $\theta$ being determined from the relationship:

$$\theta = \text{arc Sin } C_3/C,$$

where $C_3$ is the velocity of propagation of said acoustic waves in said sound conductors, and C is the velocity of propagation of mechanical vibrations, excited by said wave of acoustic vibrations, along said wall of said monolayer reservoir; a body of each of said sound conductors comprising aqueous solutions of compounds selected from the group consisting of alcohols, alkalies, acids, and salts of inorganic acids, said solutions having an approximately parabolic temperature dependence on the velocity of propagation of said wave of acoustic vibrations therein, the concentration of said solutions being such that the maximum velocity of propagation of said wave of acoustic vibrations lies in the range of an average temperature of said wall of said monolayer reservoir; a generator of electric oscillations having an output coupled to said emitter of a wave of acoustic vibrations; an amplifier of electric signals having an input coupled to said receiver of an acoustic wave and an output; a recorder of the amplitude of electric signals coupled electrically with said output of said amplifier of electric signals, the amplitude being used for ascertaining said gas-liquid or liquid-liquid interface.

* * * * *